United States Patent
Tanabe et al.

(10) Patent No.: US 12,542,457 B2
(45) Date of Patent: Feb. 3, 2026

(54) WIRELESS POWER SUPPLY DEVICE

(71) Applicant: Aeterlink Corp., Tokyo (JP)

(72) Inventors: Yuji Tanabe, Tokyo (JP); Naoto Kodate, Tokyo (JP)

(73) Assignee: Aeterlink Corp., Tokyo (JP)

( * ) Notice: Subject to any disclaimer, the term of this patent is extended or adjusted under 35 U.S.C. 154(b) by 75 days.

(21) Appl. No.: 18/712,859

(22) PCT Filed: Nov. 24, 2021

(86) PCT No.: PCT/JP2021/043081
§ 371 (c)(1),
(2) Date: May 23, 2024

(87) PCT Pub. No.: WO2023/095223
PCT Pub. Date: Jun. 1, 2023

(65) Prior Publication Data
US 2024/0356377 A1   Oct. 24, 2024

(51) Int. Cl.
*H02J 50/23* (2016.01)
*H02J 50/80* (2016.01)
*H02J 50/90* (2016.01)

(52) U.S. Cl.
CPC .............. *H02J 50/23* (2016.02); *H02J 50/80* (2016.02); *H02J 50/90* (2016.02)

(58) Field of Classification Search
CPC ............. H02J 50/90; H02J 50/23; H02J 50/80
See application file for complete search history.

(56) References Cited

U.S. PATENT DOCUMENTS

| | | | |
|---|---|---|---|
| 2015/0162751 A1* | 6/2015 | Leabman | H02J 50/27 307/104 |
| 2017/0331330 A1* | 11/2017 | Yeo | H01Q 3/36 |
| 2019/0131701 A1 | 5/2019 | Watanabe et al. | |
| 2019/0288566 A1* | 9/2019 | Park | H02J 50/20 |

FOREIGN PATENT DOCUMENTS

| | | | |
|---|---|---|---|
| CN | 107039772 | * 8/2017 | |
| JP | 2006-074697 A | 3/2006 | |
| JP | 2010-41566 A | 2/2010 | |
| KR | 20180115932 | * 10/2018 | |
| WO | 2017/216871 A1 | 12/2017 | |
| WO | WO-2018048061 A1 * | 3/2018 | H01Q 9/0414 |
| WO | 2020/084841 A1 | 4/2020 | |

OTHER PUBLICATIONS

International Search Report of PCT/JP2021/043081 dated Jan. 11, 2022.

* cited by examiner

*Primary Examiner* — Yong Hang Jiang
(74) *Attorney, Agent, or Firm* — Mattingly & Malur, PC

(57) ABSTRACT

A wireless power-supply device is configured to realize a variety of radiation patterns. The wireless power-supply device includes; a meta-surface including a plurality of waveguide patches and a plurality of switches arranged in association with the plurality of waveguide patches; a control device for controlling a state of power supply to the plurality of switches; and an antenna for emitting electromagnetic waves for transmitting power. The wireless power-supply device is configured to change a relation of connection of the plurality of waveguide patches by turning on or off the plurality of switches, so as to change a radiation pattern of electromagnetic waves radiated from the antenna.

15 Claims, 30 Drawing Sheets

(A)

10
210

220

(B)

10

(A)
10

(B)
10

(C)
10

(D)
10

(A)

(B)

WIRELESS POWER SUPPLY DEVICE

FIELD OF THE INVENTION

Relevant Applications

The present invention relates to a wireless power-supply device.

BACKGROUND

Oftentimes, a wireless power-supply device has had problems when performing the control of antenna directivity. A way of performing the control is not uniform, and for example, an omnidirectional antenna for transmitting signals in various directions, or a directional antenna for transmitting signals most strongly in one direction, etc., has been used depending on the use mode.

For example, in WO 2020/084841 A1 (Patent Document 1), it is disclosed that "an antenna module to be provided to a vehicle includes: an array antenna configured to form a beam directed from an aperture provided in an exterior body panel of the vehicle, toward a vehicle outside; and a housing holding the array antenna in a vehicle inside (see abstract)."

PRIOR ART DOCUMENTS

[Patent Document 1] JP-A-2010-41566

SUMMARY OF THE INVENTION

Problem to be Solved by the Invention

The present invention provides a wireless power-supply device configured to realize a variety of radiation patterns, as the most important characteristic.

Means for Solving the Problem

In order to solve the above-mentioned problems, for example, the configurations described in the claims can be adopted.

Although the present application includes a plurality of means for solving the above-mentioned problems, for example, according to an embodiment, a wireless power-supply device is provided. The wireless power-supply device is configured to include;
- a meta-surface including a plurality of waveguide patches and a plurality of switches arranged in association with the plurality of waveguide patches;
- a control device for controlling a state of power supply to the plurality of switches; and
- an antenna for emitting electromagnetic waves for transmitting power.

The wireless power-supply device is configured to change a relation of connection of the plurality of waveguide patches by turning on or off the plurality of switches, so as to change a radiation pattern of electromagnetic waves radiated from the antenna.

Effect of the Invention

The wireless power-supply device which is capable of realizing a variety of radiation patterns is thus provided.

DESCRIPTION OF THE PREFERRED EMBODIMENTS

Figure 1:
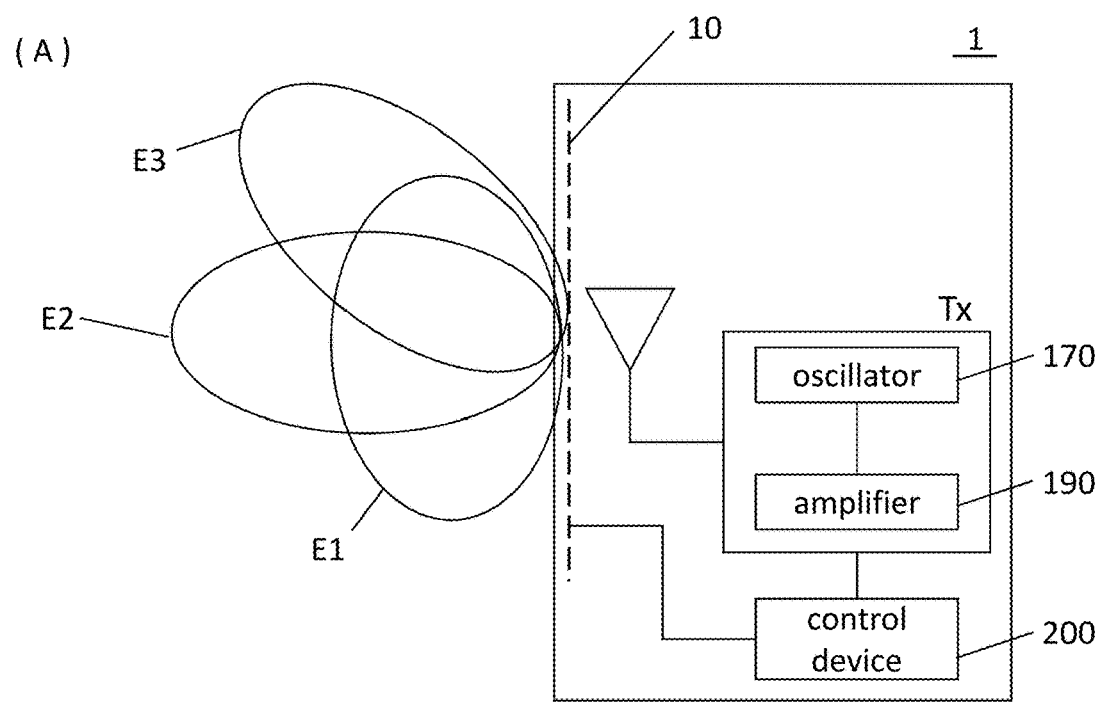
FIG. 1 schematically illustrates an example of a wireless power-supply device including a meta-surface, in (A) and (B) (Example 1).
Figure 1:
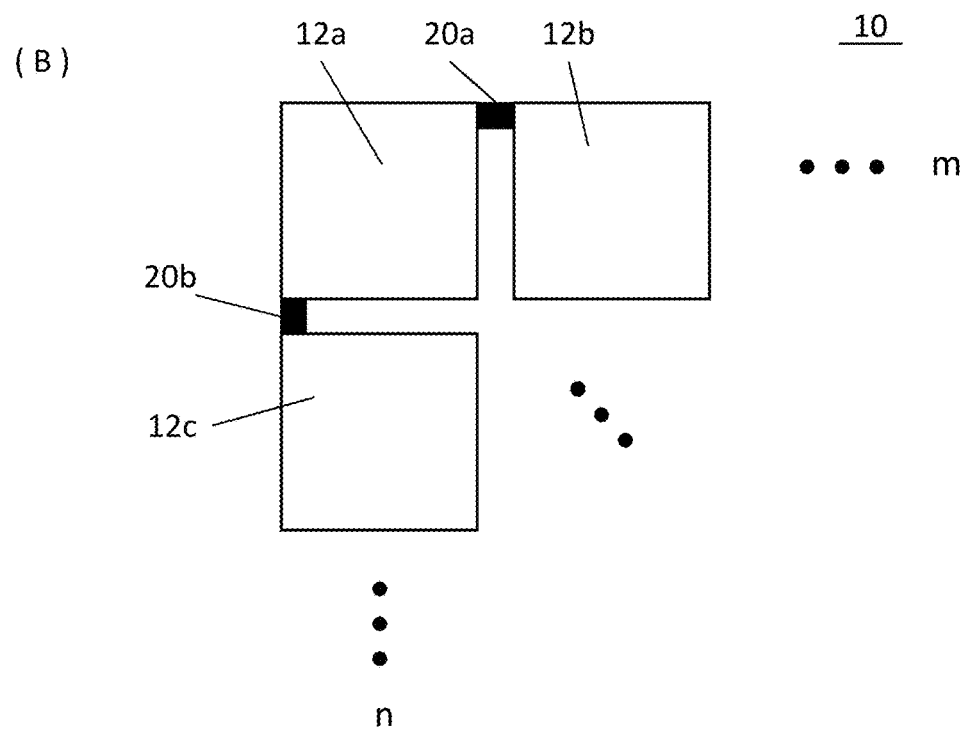

In the fields of plants (FA: Factory Automation), IoT (Internet of Things), home appliances, and the like, various devices such as sensors and actuators are used. In recent years, eliminating a cable for connection of such a device has been studied. This is because when power supply wiring is performed with a wire, there will be problems such as the burden, disconnection, or maintenance of the wiring.

With regard to the beamforming (or adjustment of beam) for controlling the directivity of an antenna, further improvements have been expected to realize more various radiation patterns. In recent years, utilizing of a meta-material (or metamaterial) for this control has been investigated.

The "meta-material" refers to an artificial substance which is capable of behaving in a manner that does not exist in natural materials, with respect to electromagnetic waves including light. In general, the meta-material is configured to behave as a homogeneous medium with respect to electromagnetic waves, by artificially arranging microscopically small unit elements at a regular interval at a distance that is sufficiently smaller than the wavelength of electromagnetic waves.

For example, the adjustment of beam by using a meta-material is disclosed in WO 2020/084841 A1 (Patent Document 1). However, according to the disclosure, the meta-material is only used as an alternative to the reflective element, but the way of applying the meta-material is limited, and various radiation patterns are not realized.

The present embodiments provide a wireless power-supply device which is configured to realize various radiation patterns by using a meta-material. In particular, the present embodiment provides a wireless power-supply device which is capable of supplying electric power to various devices such as a sensor or an actuator, in the fields of FA, IoT, household appliances, and the like. The present embodiment is configured in consideration of the below-mentioned problems of the conventional wireless power-supply devices.

"Physical Problems"

According to the conventional wireless power-supply devices, when electromagnetic waves (or microwaves or the like) for wirelessly supplying electric power in a free space are transmitted, a loss may occur at supplying power. In particular, the efficiency in receiving power depends on the direction of the transmitting-antenna of the power-supply device and the location of the power receiving device. However, if these settings are not appropriate, there is a risk that it is difficult to receive electric power in a good condition.

"Legal Problems"

According to the conventional wireless power-supply devices, there is a case that upper limits or the like for transmitting power are legally regulated for the reasons of the regulations on the antenna power and the antenna gain.

"Electrical Problems"

According to the conventional wireless power-supply devices, there is a case that a plurality of power-supply devices are used simultaneously in the same space. In this case, when two waves traveling in a free space are overlapped with each other, standing waves (or stationary waves) may be formed. In particular, such an event is likely to occur when there are a plurality of waves having the same wavelength, the same period, the same amplitude, or the same speed in the same space. In this case, there is a risk that electric power is consumed for detecting power.

"Environmental Problems"

According to the conventional wireless power-supply devices, when a power receiving device frequently changes its position, there is a risk that it is difficult to set the optimum beamforming for wirelessly supplying power from the power transmitting device. For example, when a power receiving terminal is provided at a tip or the like of a robot hand operated in a factory, the direction of the beamforming is not uniquely determined because the position of the power receiving terminal is changed for every use.

Hereinafter, a first embodiment of a wireless power-supply device which is configured to realize various radiation patterns will be described with referring to FIGS. 1 to 11.

Example 1

With referring to FIGS. 1 (A), (B), in particular, a wireless power-supply device 1 using a meta-surface 10 according to the present embodiment is schematically illustrated.

In particular, FIG. 1 (A) schematically illustrates a side view of the meta-surface 10.

In particular, FIG. 1 (B) schematically illustrates a front view of the meta-surface 10.

With referring to FIG. 1 (A), the reference numeral Tx schematically denotes a transmitting device (or power transmitting device). The transmitting device Tx is configured to transmit (or emit or radiate) electromagnetic waves for supplying electric power (hereinafter referred to as electromagnetic waves) (E1 to E3) to the outside by using any suitable antennae (not shown). The electromagnetic waves (E1 to E3) are wirelessly transmitted in a free space (or three-dimensional space) to be received by a receiving device (not shown).

It is possible to use various types of antennae in the transmitting device Tx for emitting electromagnetic waves (E1 to E3) to the outside, in the wireless power-supply device 1 according to the present embodiment. For example, a single patch antenna (or planar antenna) or a plurality of patch antennas (including patch array antenna) may be used as the antenna for the wireless power-supply device 1. The transmitting device Tx is provided with any suitable means for generating electromagnetic waves (including microwaves) to be radiated from the antennae.

For example, the transmitting device Tx is provided with a microwave oscillator 170 and an amplifier 190 to generate electromagnetic waves (E1 to E3). Also, a control device (or controller) 200 is provided to control the radiation pattern (or beam-direction) of the generated electromagnetic waves.

According to the present embodiment, the wireless power-supply device 1 is further provided with a reconfigurable meta-surface (hereinafter, simply referred to as a meta-surface) 10 which is capable of freely controlling the radiation pattern of the transmitting device Tx with regard to the above-mentioned antenna. The meta-surface 10 is capable of shifting a beam, so that no phase shifter is required in the transmitting device Tx. That is, as will be described later, the control device 200 is capable of adaptively changing the current pattern on the meta-surface 10 by turning on or off the high-frequency signals. Accordingly, the control device 200 is capable of controlling the radiation pattern of the meta-surface 10.

The control device 200 is cable of controlling not only the radiation of the electromagnetic waves conducted in the normal transmitting device Tx but also the radiation of the electromagnetic waves through the added meta-surface 10. In the present embodiment, it is described that the control of the meta-surface 10 is performed by the control device 200 of the transmission device Tx. However, it is also possible to provide a control device for controlling the meta-surface 10, separately from the control device 200 of the transmission device Tx.

Hereinafter, the descriptions of the control of the radiation pattern of electromagnetic waves performed at the control device 200 mainly relates to the control of the radiation pattern of electromagnetic waves radiated through the meta-surface 10.

The meta-surface 10 is a kind of a meta-material (or artificial medium) which is a waveguide element having a periodic arrangement of minute structures with respect to the wavelength to realize an arbitrary dielectric constant and/or magnetic permeability. The meta-surface 10 has a feature capable of controlling the reflection of electromagnetic waves incident on the surface and/or the transmission phase of electromagnetic waves. Accordingly, it is possible to use the meta-surface 10 to control an incident light. In the present embodiment, an antenna is designed using the meta-surface 10 by applying the same concept with respect to microwaves. A planar antenna itself which combines a meta-material and an antenna may also be referred to as a meta-surface 10.

As can be seen from FIG. 1 (A), (B), the meta-surface 10 is composed of a plurality of waveguide patches or radiation patches (hereinafter simply referred to as patches) 12a, 12b, 12c, and so on. Each patch 12a, 12b, 12c is configured to have a periodic arrangement of minute structures with respect to the wavelength to realize a desired dielectric constant and/or magnetic permeability.

Each patch is configured to make electromagnetic waves incident from one surface side be radiated from the opposite surface side by passing through the inner part of the patch.

Each patch 12a, 12b, 12c is configured to have a predetermined shape and is regularly arranged. For example, each patch 12a, 12b, 12c is configured to have a quadrangular shape (for example, a square shape) on the X-Y plane as illustrated in FIG. 1 (B), and to have an ultra-thin thickness in the Z-axis direction as illustrated in FIG. 1 (A). The respective patches 12a, 12b, 12c are regularly arranged on the same plane. In this way, a plurality of the patches 12a, 12b, 12c are preferably configured to be compact, ultra-thin, and ultra-light in weight.

With referring to FIG. 1 (B), a patch arrangement having an array of m×n (for example, "m" indicates the number of patches in the width direction, and "n" indicates the number of patches in the length direction) of the patches which are arranged periodically in the vertical direction (or length direction) and the horizontal direction (or width direction) on the same plane is illustrated. For example, the adjacent patches are arranged to align a position of a length of a side of each quadrangle in the longitudinal direction (for example, positions of both ends of each side) and to uniformly keep a distance (or gap) between the adjacent quadrangles in the horizontal direction.

Each one of the plurality of patches 12a, 12b, 12c constituting the meta-surface 10 may be made of an arbitrary material. For example, each patch 12a, 12b, 12c may be formed using a noble metal such as gold, silver, or copper, etc. In addition, each patch 12a, 12b, 12c may be disposed on an arbitrary substrate (for example, a silicon substrate or the like) which is not illustrated.

Each patch 12a, 12b, 12c may be manufactured from an arbitrary process. For example, the plurality of patches 12a, 12b, 12c may be configured to be arranged in a predetermined pattern. For example, a meta-surface 10 having the plurality of patches 12a, 12b, 12c may be formed by performing a control of forming the surface of the substrate into a uniform thickness and by drawing, creating, and coating a nanopattern on the film. In this case, for example, an arbitrary process such as the spin coating method or the like may be used for that purpose. The number of the patches 12a, 12b, 12c to be used is not limited, but is preferably selected to constitute a relatively inexpensive and small-sized meta-surface 10.

With referring to FIG. 1 (B), the wireless power-supply device 1 according to the present embodiment is provided with high-frequency switches 20a, 20b, each of which is arranged in a adjacent gap formed between two of the plurality of patches 12a, 12b, 12c. Accordingly, the wireless power-supply device 1 is configured to selectively control the high-frequency switches 20a, 20b so as to freely change the current pattern on the meta-surface 10.

The high-frequency switch 20a, 20b is a switch capable of switching a route of high-frequency signals, and is also referred to as a RF switch. There are mechanical type and electronic type with regard to the high frequency switch 20a, 20b. Each high-frequency switch 20a, 20b (hereinafter simply referred to as a switch) is capable of being matched to the characteristic impedance for passing the high-frequency signals.

With referring to FIG. 1 (B), each switch 20a, 20b is provided between two of the adjacent patches 12a, 12b, 12c in the vertical direction and/or the horizontal direction. As a result, a state of power supply with regard to a part of the two patches which are arranged to sandwich one switch therebetween is controlled by switching the energization condition of the switch. The respective switches 20a, 20b are centrally managed by a control device (not illustrated) and individually controlled. Consequently, the plurality of patches 12a, 12b, 12c are not all uniformly powered, and it is possible to supply power for each part of the patch, for each patch, or for each subset (or group) of the patches.

For example, in the configuration illustrated in FIG. 1 (B), the patches 12a, 12b, 12c each formed in a square shape having the same size are aligned at the same interval in the vertical direction and the horizontal direction with the relative positions aligned. The adjacent patches 12a, 12b, 12c are arranged so as to sandwich the switch 20a, 20b therebetween, on the outer periphery side of the respective patches. In this way, if a plurality of patches 12a, 12b, 12c, and so on are provided to include "m" pieces of patches in the horizontal direction and "n" pieces of patches in the vertical direction, it is possible to use a total of "m*(n−1)+ n*(m−1)" pieces of the switches 20a, 20b, and so on. In other words, it is possible to use "2m*n−m−n" pieces of the switches 20a, 20b, and so on.

The current pattern flowing through the respective patches 12a, 12b, 12c may be controlled by using a combination of ON/OFF of the corresponding switches 20a, 20b. For example, ON/OFF of a route through which high-frequency signals pass may be switched by using an electronic high-frequency switches 20a, 20b, based on the status of the control signals. Accordingly, if X pieces of switches are provided as a whole, there are "the X power of 2" types of the combination of the switches. As a result, it is possible to significantly enhance the versatility of the beamforming when comparing to the case of general phase controlled type beamforming.

Therefore, according to the present embodiment, it is possible to configure the wireless power-supply device 1 which is capable of performing the beamforming in various forms by arranging the plurality of patches 12a, 12b, 12c and the plurality of switches 20a, 20b, as described above. With referring to FIG. 1 (A), it is schematically illustrated that the beamforming is performed in a plurality of different ways by individually controlling the respective switches 20a, 20b as denoted by the reference numerals E1, E2, and E3. Incidentally, the reference numerals E1, E2, and E3 are denoted to be superimposed with each other in FIG. 1 (A), but in practice, any one of the reference numerals E1, E2, and E3 is selectively used.

For example, as denoted by the reference numeral E1, the wireless power-supply device 1 may adjust the orientation and the extent of the transmitted waves or beams to be extended along the plane of the meta-surface 10.

For example, as denoted by the reference numeral E2, the wireless power-supply device 1 may adjust the direction and the extent of the beams to be extended perpendicularly (or at an angle of about 90 degrees) with respect to the plane of the meta-surface 10.

For example, as denoted by the reference numeral E3, the wireless power-supply device 1 may adjust the orientation and the extent of the beams to be extended at an oblique angle (or at an acute angle) with respect to the plane of the meta-surface 10.

In addition, the wireless power-supply device 1 may perform the beamforming so as to more finely adjust the angle, the direction, the extent, and the like of the beam to be radiated with respect to the plane of the meta-surface 10.

Figure 2:
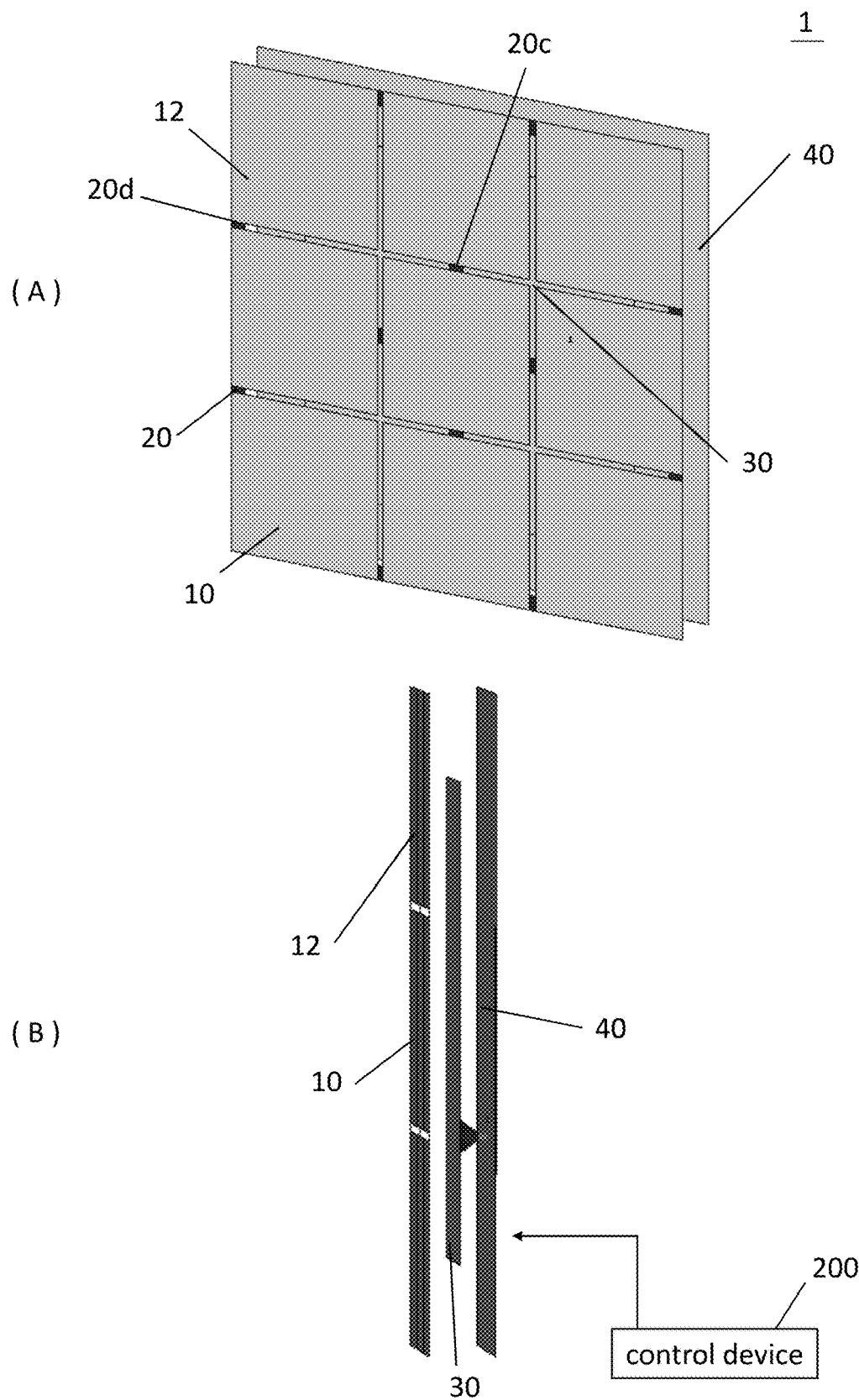
FIG. 2 schematically illustrates an example of a wireless power-supply device including a meta-surface having an array of 3×3, in (A) and (B) (Example 1).

With referring to FIG. 2 (A), (B), the wireless power-supply device 1 illustrated in FIG. 1 (A), (B) is more specifically illustrated.

In particular, FIG. 2 (A) schematically illustrates a perspective view of the wireless power-supply device 1.

In particular, FIG. 2 (B) schematically illustrates a side view of the wireless power-supply device 1.

As can be seen from FIG. 2 (A), (B), the wireless power-supply device 1 may be configured as a three-layered structure. The meta-surface 10 composed of the plurality of patches 12 illustrated in FIG. 1 is disposed on the front side of the layered structure. The radiating side (or radiating element) 30 of the antenna is disposed on the center side of the three-layered structure. A GND (or ground plate) 40 is disposed at the back side of the three-layered structure. For example, the antenna 30 is a single patch antenna. The antennae 30 is configured to be supplied with power by a feed line (not illustrated) through the GND 40 and to radiate electromagnetic waves on the opposite side (in other words, on the side of the meta-surface 10).

A control device (or controller) 200 for controlling the radiation of electromagnetic waves is provided inside or outside the above-mentioned three-layered structure. Preferably, the control device 200 is configured to control the operation of the wireless power-supply device 1, but in particular to control the operation of the antenna 30 and the meta-surface 10.

As can be seen from FIG. 2 (A), (B), the plane of the meta-surface 10 is arranged close to and in parallel with the plane of the radiating element of the patch antenna 30. The separation distance therebetween is selected to preferably transmit electromagnetic waves radiated from the patch antenna 30 to the outside through the meta-surface 10.

In this example, the meta-surface 10 is configured to have nine pieces of patches 12 in a 3×3 arrangement (comprising m pieces in the horizontal direction and n pieces in the vertical direction). Each patch 12 is formed to have a square shape of the same size.

Accordingly, in this example, a total of 12 pieces of switches 20 are provided based on the above-mentioned formula of "m*(n−1)+n*(m−1)" or "2n*m−m−n".

As a result, there are a total of 4096 (which corresponds to the X power of 2, in other words, the 12 power of 2) types of the combination of the switches 20.

In a case where nine pieces of patches 12 are arranged in the 3×3 arrangement, it is possible to divide them into one patch 12 arranged at the center and eight patches 12 arranged at the outside to surround the centrally arranged patch 12. The former is distinguished from the latter in that it is disposed not to be in contact with the outer periphery of the meta-surface 10. Based on this difference, the positions of the switches 20 assigned to the respective patches 12 may be changed.

For example, as denoted by the reference numeral 20c, a switch 20 may be assigned at the center side of each side of the square shape to be interposed between the centrally arranged patch 12 and the adjacent patch 12.

For example, as denoted by the reference numeral 20d, a switch 20 may be assigned at each side of the square shape, at a side of the outer periphery of the square shape, to be interposed between two of the adjacent patches 12 of the eight patches 12 which are arranged at the outside.

In this way, the switch 20 arranged on the outer patch is provided to approach the outer peripheral side of the outer patch as much as possible so that it is possible to enlarge the distance between the switch 20c or the like arranged at the central patch and the switch 20d or the like arranged at the outer peripheral side as much as possible. Accordingly, it becomes possible to reduce noises caused by electric current flowing between the respective switches.

Also, in the example illustrated in FIG. 2, the centrally arranged patch 12 may be supplied with power from four switches. Also, each one of the eight patches 12 arranged at the outside may be supplied with power from three switches. As described above, by changing the positions of the switches in accordance with the positions of the patches, it is devised to relatively spread the energization condition on the surface of the meta-surface 10 across the entire surface, as a whole.

It is possible to establish a small size construction of the meta-surface 10, as a whole. For example, in this example, it is possible to configure an antenna of 900 MHz band with a square shape having a length of about 20 cm at its one side, as a whole. However, this is merely one example, and the present embodiment is not limited thereto.

Figure 3:
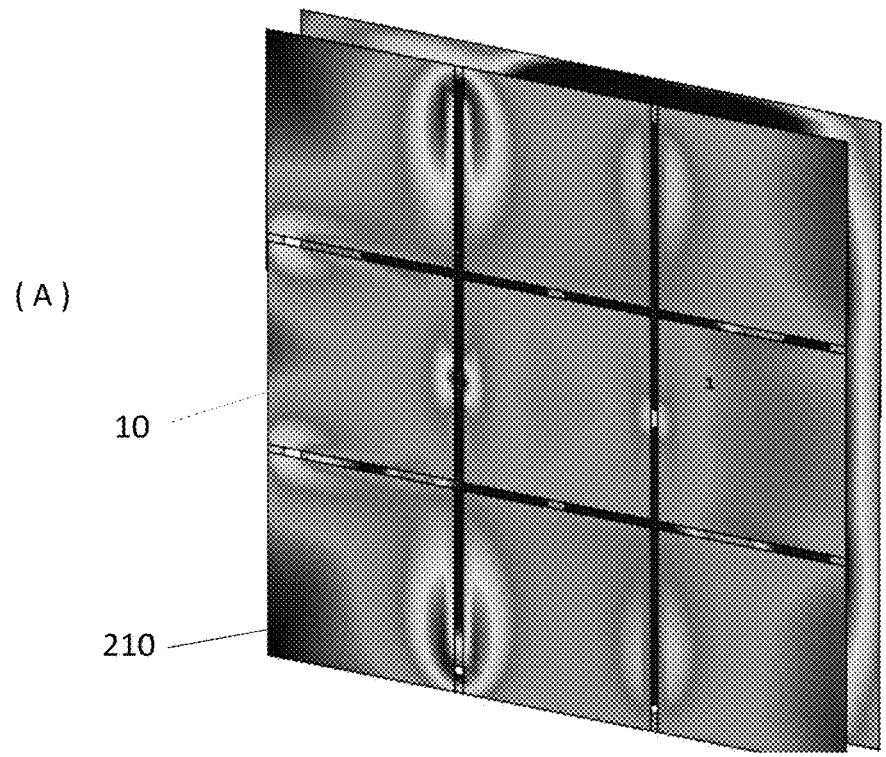
FIG. 3 illustrates an example of a state of power supply of a meta-surface having an array of 3×3, in (A) and (B) (Example 1).
Figure 3:
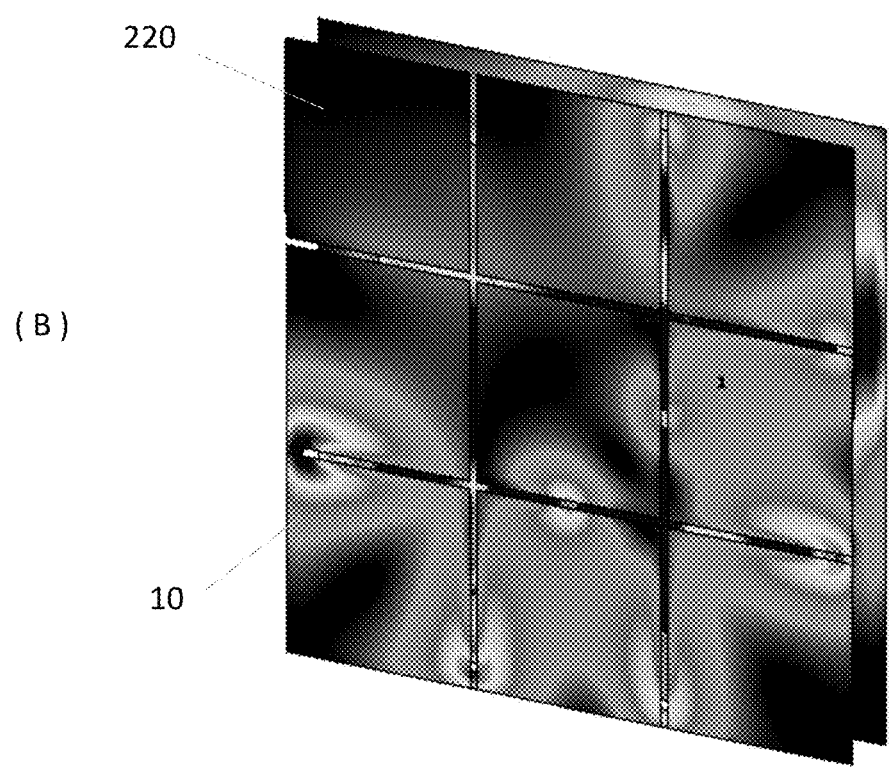

With referring to FIG. 3 (A), (B), current patterns are shown when the respective patches 12 of the meta-surface 10 illustrated in FIG. 2 (A) are selectively supplied with power by controlling the respective switches 20.

FIG. 3 (A) illustrates a state of current pattern on the surface of the meta-surface 10 when all of the twelve switches 20 are turned on to supply power to all of the nine patches 12.

FIG. 3 (B) illustrates a state of current pattern on the surface of the meta-surface 10 when only four switches 20 on the upper left among the nine patches 12 are selectively turned off and only the remaining eight switches 20 are turned on. This state is more specifically shown in FIG. 4 (B), and the details will be described later.

In FIG. 3 (A), (B), the current patterns at the time of power supply are represented by gray scale. At this time, a state of energization at the time of turning on the switch 20 is shown by a relatively bright color (or white). Also, the state in which the switch 20 is turned off not to supply power thereto is shown by a relatively dark color (or black).

FIG. 3 (A), (B) are obtained by simulations performed on a computer using a mathematical model. At this time, the states at the time of power supply are required under an ideal condition in which there is no obstacle or disturbance etc., but it is possible to estimate that the actual state is almost the same.

With referring to FIG. 3 (A), it can be seen that all of the nine patches 12 may be energized by turning on all of the switches 20.

As can be seen from the corner denoted by the reference numeral 210 in the figure, the four corners of the meta-surface 10 are shown in black because the switch 20 is not provided in the vicinities of the corners. This means that it is possible to ignore the four corners of the meta-surface 10 from the viewpoint of the optimization of the beamforming.

Incidentally, it is possible to increase the number of the switches to spread the energization on the surface of the meta-surface 10 over its entire surface. This selection may be comprehensively determined from various viewpoints, such as the efficiency of the control of the meta-surface 10 and the cost thereof.

With referring to FIG. 3 (B), it can be seen that it is possible to selectively turn off some of the switches 20 to energize only a part of the nine patches 12.

As can be seen from the upper left region denoted by the reference numeral 220 in the figure, the region where the switches 20 are selectively turned off is represented by a relatively dark color. By comparing the two figures of FIG. 3 (A), (B), it becomes clear that the energization condition of a part of the meta-surface 10 is effectively changed. Therefore, by using the nine patches and the twelve switches in combination, it is possible to selectively configure various energization conditions.

Figure 4:
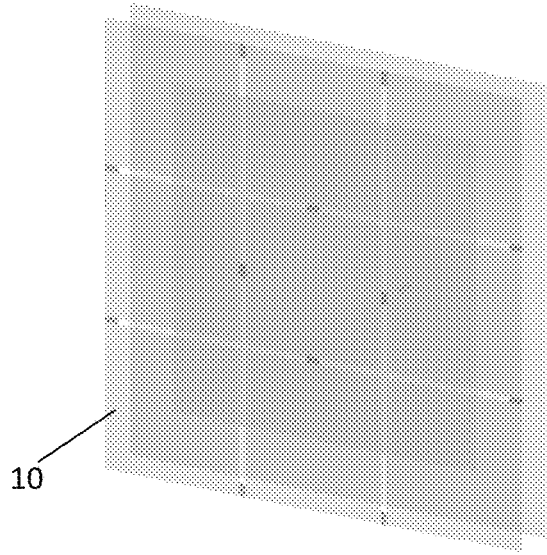
FIG. 4 illustrates an example of switching of switches provided in the meta-surface having the array of 3×3, in (A) to (D) (Example 1).
Figure 4:
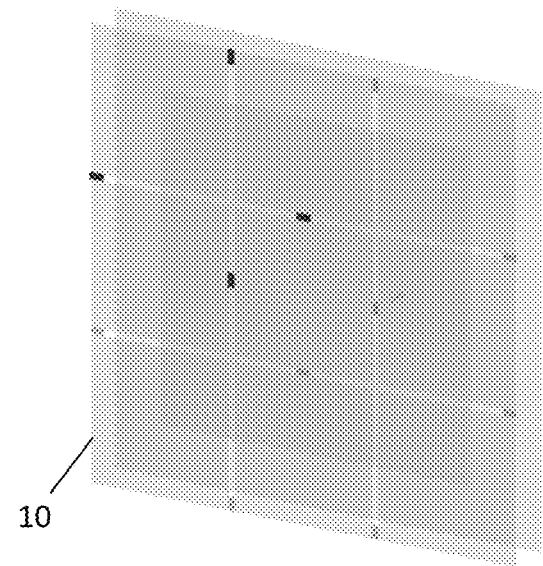
Figure 4:
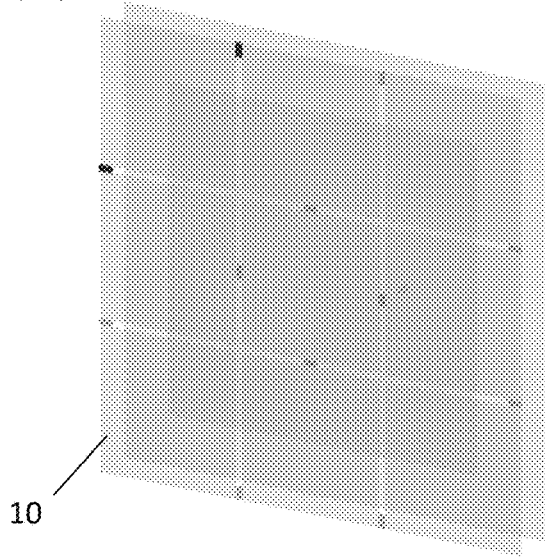
Figure 4:
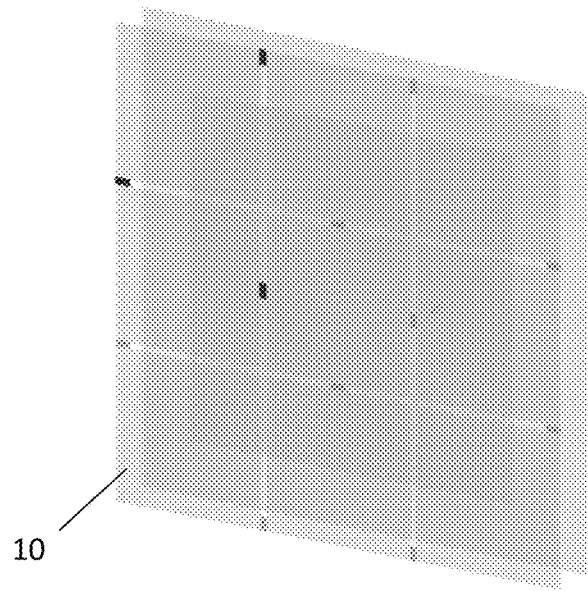

With referring to FIG. 4 (A) to (D), it is illustrated that the energization conditions of the switches 20 are divided more finely, comparing with the cases exemplified in FIG. 3 (A), (B). In the respective figures (B) to (D), the switches represented by the dark color correspond to the switches which are turned off.

FIG. 4 (A) illustrates a state in which all of the twelve switches 20 are turned on as in the case of FIG. 3 (A).

FIG. 4 (B) illustrates a state in which only the four switches 20 in the upper left region are selectively turned off, and the remaining eight switches 20 are turned on as in the case of FIG. 3 (B).

FIG. 4 (C) illustrates a state in which only the two outermost switches in the upper left region are selectively turned off and the remaining ten switches are turned on.

FIG. 4 (D) illustrates a state in which only three switches on the upper left region are selectively turned off and the remaining nine switches are turned on.

As described above, when changing the energization condition of the upper left region, it is possible to change the energization condition, step by step, in various manners. This also applies to the upper right region, the lower right region, the lower left region, and the center region.

Figure 5:
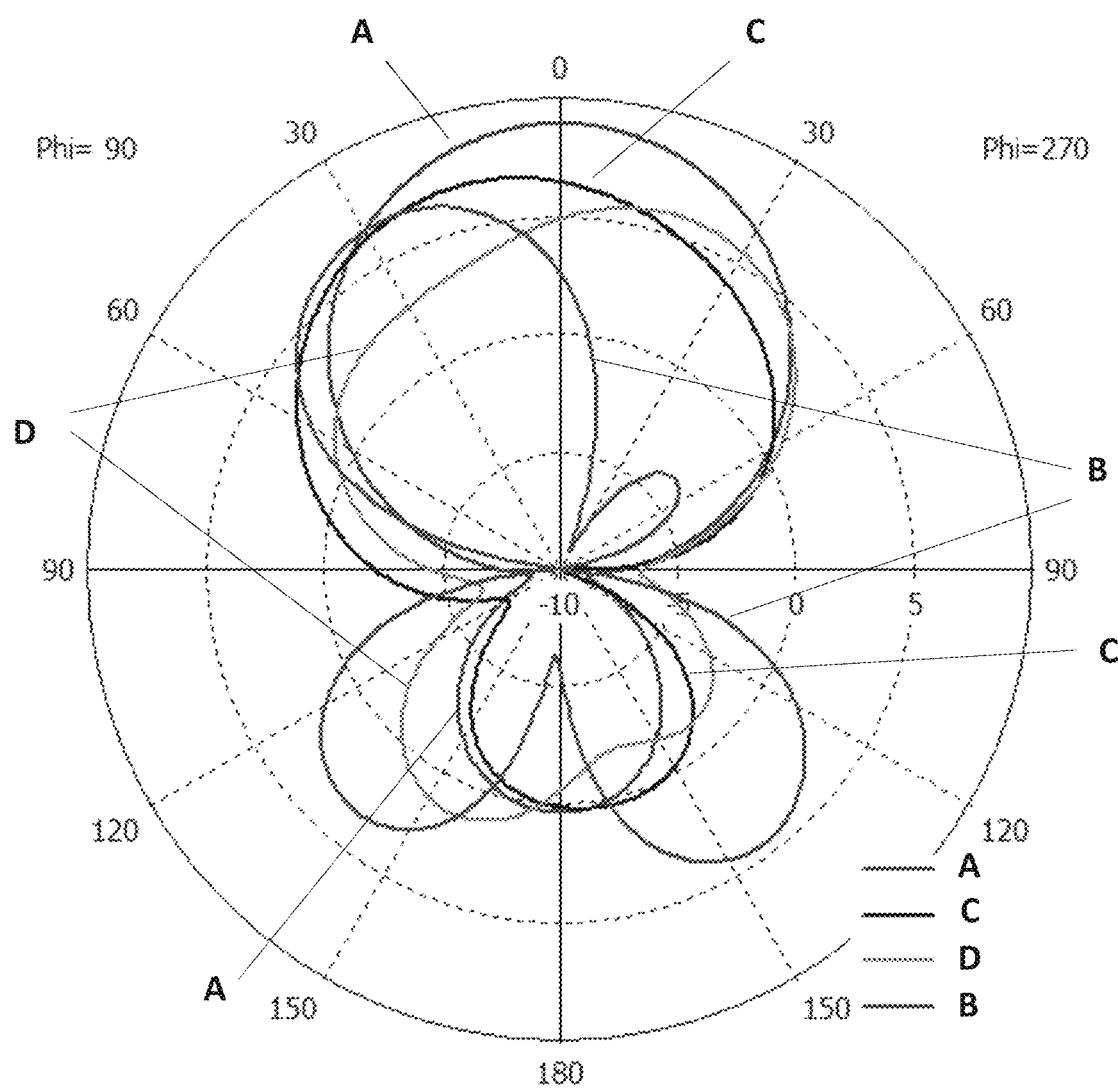
FIG. 5 illustrates an example of a radiation pattern corresponding to switching of the switches of FIG. 4 (Example 1).

With referring to FIG. 5, the state of the change in the radiation pattern of electromagnetic waves radiated from the antenna 30 is illustrated. In FIG. 5, with respect to the respective cases illustrated in FIG. 4 (A) to (D), the radiation directions of the antenna are illustrated. In this figure, four radiation patterns are shown in an overlapped manner so as to be clearly contrasted with each other. It can be seen that the radiation direction and the extent are different in the respective cases.

For example, in the upper part of FIG. 5 (A), electromagnetic waves are radiated symmetrically in the left-right directions around a direction of 0 degree.

For example, in the upper part of FIG. 5 (B), electromagnetic waves are radiated asymmetrically to be biased left-ward relative to the direction of 0 degree.

As described above, with referring to FIG. 5, it can be seen that the direction, the extent (or range), and the like of electromagnetic waves are finely changed for the respective cases of FIG. 4 (A) to (D). In the present example, by adapting this feature, it becomes possible to variously control the direction, the extent, and the like of electromagnetic waves radiated from the antenna 30.

With referring to FIG. 5, it can be seen that in the respective cases of (A) to (D), the main lobe (or lobe along the strongest radiation direction) and the side lobe (or lobe excluding the main lobe) are changed, and consequently, the directivity of the antenna is changed. The same applies to changes in the front-rear ratio and the beam width.

Therefore, even in a case where the relative relationship between the wireless power-supply device 1 according to the present embodiment and the power receiving device which is used by being made as a pair with the wireless power-supply device 1 is changed variously, it becomes possible to constantly supply power (or electromagnetic waves) in a good condition following the change, by finely controlling the direction, the extent, and the like of the radiated electromagnetic waves.

Incidentally, the contents of FIG. 5 are obtained by simulations performed on a computer using a mathematical model. At this time, the states at the time of power supply are required under an ideal condition in which there is no obstacle or disturbance etc. This also applies to FIGS. 6 and 7, which are exemplified below.

Figure 6:
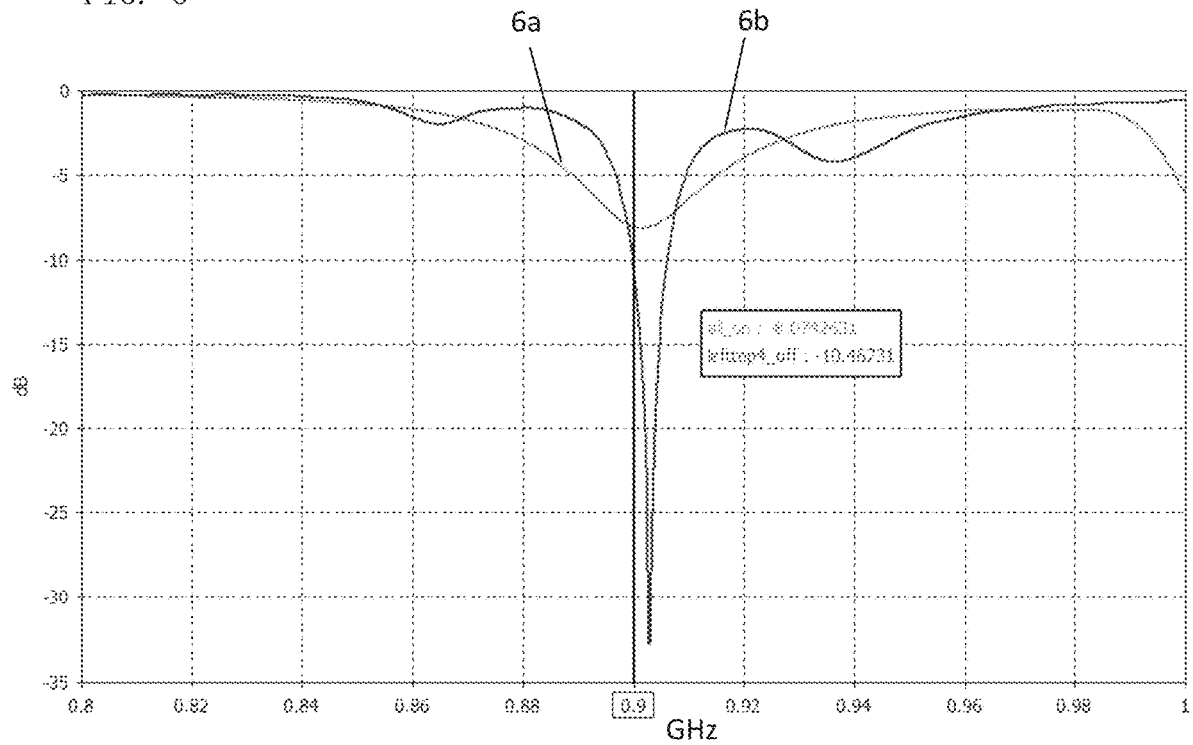
FIG. 6 illustrates a graph showing a reflection loss of the meta-surface having the array of 3×3 (Example 1).

With referring to FIG. 6, a graph is shown to illustrate the state of reflection loss (or return loss) of the wireless power-supply device 1 illustrated in FIGS. 2 to 4.

In the figure, 6a denotes a graph corresponding to the state illustrated in FIG. 3 (A) or FIG. 4 (A).

In the figure, 6b denotes a graph corresponding to the state illustrated in FIG. 3 (B) or FIG. 4 (B).

As is known to those skilled in the art, when an impedance change occurs on the side of the wireless power-supply device 1, a reflected wave may be caused resulting from it, and a reflection loss may be generated. In the present embodiment, when the condition of on/off of the plurality of switches 20 are variously switched, a change in the impedance may occur in the wireless power-supply device 1 side. It is possible to estimate this change from FIG. 6.

In the application example illustrated in FIG. 6, the operation of the wireless power-supply device 1 is performed based on the supposition of 0.9 GHZ. As can be seen from 6a in FIG. 6, when all the switches are turned on, the reflection loss is about-8 dB at 0.9 GHz. On the other hand, as can be seen from 6b in FIG. 6, when some of the switches are turned off, the reflection loss is about-10 dB at 0.9 GHz.

As can be understood from FIG. 6, it is possible to avoid an area where the reflection loss is rapidly increased, by operating the wireless power-supply device 1 at 0.9 GHZ.

Also, as can be understood from FIG. 6, the power spatially transmitted is changed according to the combination of the switches 20. Therefore, the present embodiment adapts a system-design in which the power transmitted from the antenna is represented by using EIRP (or Effective Isotropic Radiated Power) and the value of the output power is made to be 36 dBm at all times as for the EIRP. Therefore, in the present embodiment, it is possible to control the output of the amplifier (see the amplifier 190 in FIG. 1) used in the wireless power-supply device 1 by using the control device 200.

Figure 7:
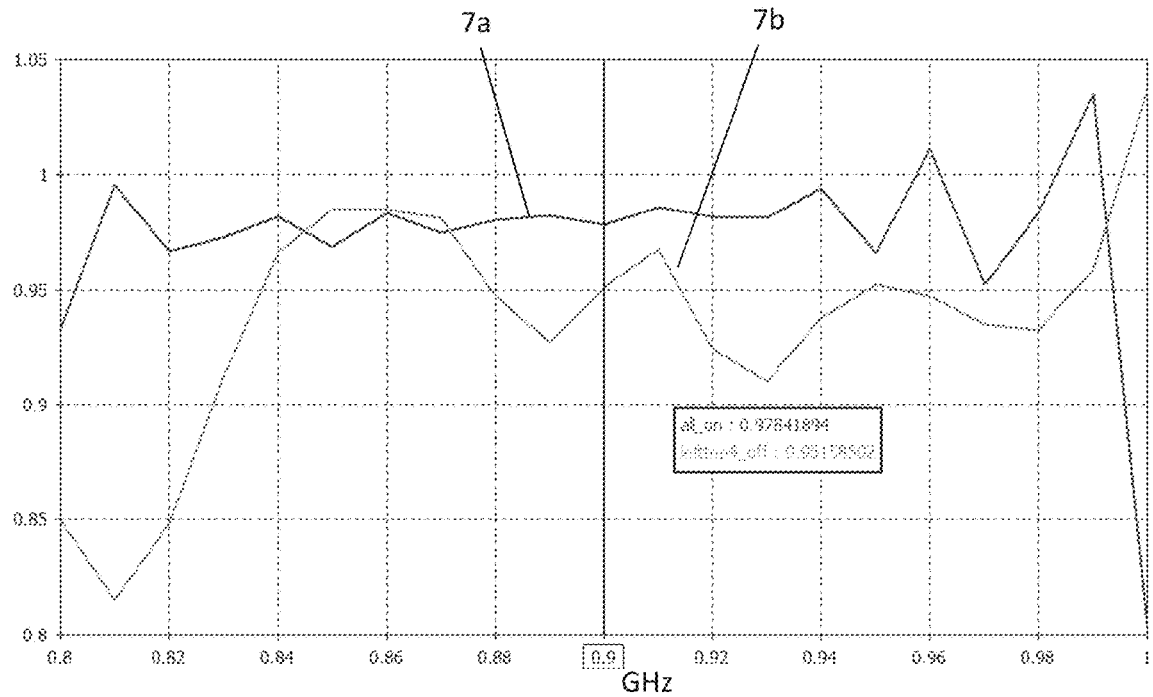
FIG. 7 illustrates a graph showing a radiation efficiency of the meta-surface having the array of 3×3 (Example 1).

With referring to FIG. 7, graphs are illustrated to show the state of the radiation efficiency of the wireless power-supply device 1 illustrated in FIGS. 2 to 4.

In the figure, 7a denotes a graph corresponding to the state illustrated in FIG. 3 (A) or FIG. 4 (A).

In the figure, 7b denotes a graph corresponding to the state illustrated in FIG. 3 (B) or FIG. 4 (B).

In the application example illustrated in FIG. 7, the operation of the wireless power-supply device 1 is performed based on the supposition of 0.9 GHZ. As can be seen from 7a in FIG. 7, when all the switches are turned on, the radiation efficiency is about 0.98. On the other hand, as can be seen from 7b in FIG. 7, when some of the switches are turned off, the radiation efficiency is about 0.95

In this way, the radiation efficiency is changed according to the combination of the switches. As can be seen from FIG. 7, it is generally possible to maintain the radiation-efficiency in a good condition, by operating the wireless power-supply device 1 at 0.9 GHz.

Therefore, it is possible to estimate that the wireless power-supply device 1 according to the present embodiment may be operated satisfactorily at the time of the actual application.

As described above, in the cases illustrated in FIGS. 1 to 7, the radiation pattern of the electromagnetic waves (or beams) radiated through the meta-surface 10 is changed by switching between on or off of the switches 20 which are provided in association with the plurality of patches 12.

At this time, it is possible to energize only a part of a single patch 12.

Alternatively, it is possible to energize substantially the entire single patch 12.

Alternatively, it is possible to energize only a subset of the plurality of patches 12.

Alternatively, it is possible to energize an entire set of the plurality of patches 12.

However, in the present embodiment, the way of controlling the beamforming is not limited to this example.

Figure 8:
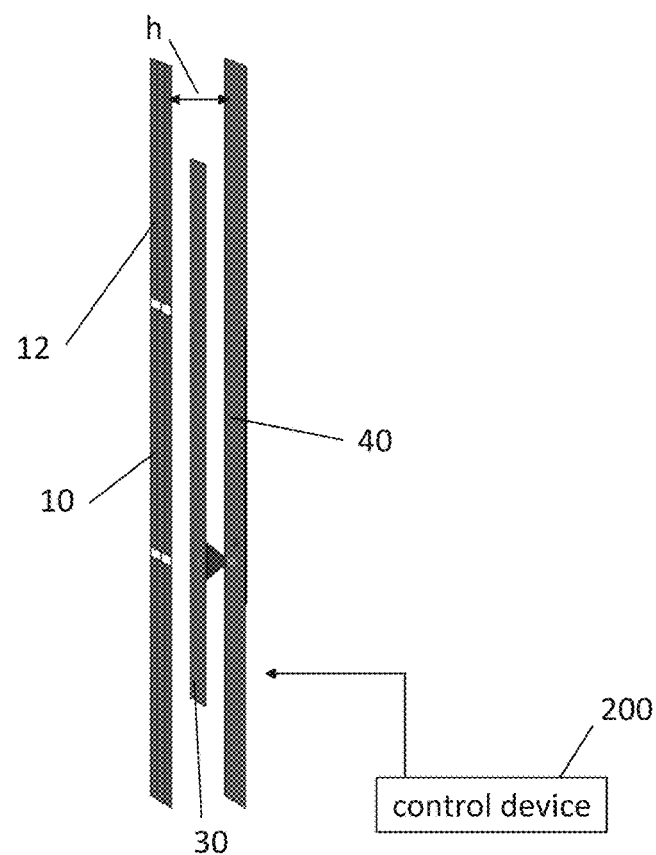
FIG. 8 illustrates an example in which a height of the meta-surface having the array of 3×3 is made to be adjustable (Example 1).

With referring to FIG. 8, it is exemplified that the radiation pattern of electromagnetic waves radiated through the meta-surface 10 is changed by adjusting the separation distance (or height h of the meta-surface) between the plane of the radiating element of the antenna 30 and the plane of the meta-surface 10 opposite to the plane of the radiating element.

Figure 9:
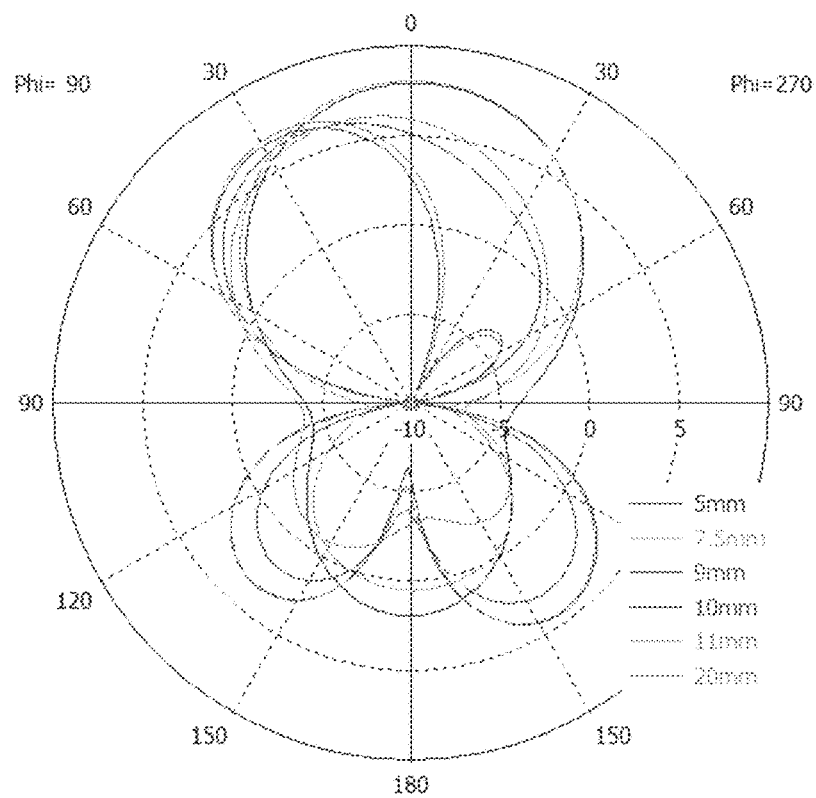
FIG. 9 illustrates an example showing a radiation pattern corresponding to the height of the meta-surface of FIG. 8 (Example 1).

FIG. 9 illustrates a change in the radiation pattern of the electromagnetic waves radiated from the antenna 30 when the height h of the meta-surface 10 is changed as illustrated in FIG. 8.

As can be seen from FIG. 8, the plane of the radiating element of the antenna 30 and the plane of the meta-surface 10 facing thereto are arranged close to each other and the separation distance therebetween is made to be changed. For example, it is possible to change the height h of the meta-surface in a range of from a few mm to tens of mm. For example, the height h of the meta-surface 10 may be changed in a range of from 5 mm to 20 mm.

The control of the height h of the meta-surface may be variously conducted mechanically and electrically. For example, in the present embodiment, the position of the antenna 30 may be fixed, and the position of the meta-surface 10 opposite to the antenna 30 may be relatively changed. Alternatively, in the present embodiment, the position of the meta-surface 10 may be fixed, and the position of the antenna 30 opposite to the meta-surface 10 may be relatively changed. Alternatively, both of them may be simultaneously applied.

With referring to FIG. 9, a change in the radiation pattern of the electromagnetic waves radiated from the antenna 30 when the height h of the meta-surface is changed in a range of from 5 mm to 20 mm is illustrated.

As can be seen from FIG. 9, when the height h of the meta-surface is changed step by step, as 5 mm, 7.5 mm, 9 mm, 10 mm, 11 mm, and 20 mm, the radiation pattern (or the direction, the extent, and the like) of the electromagnetic waves radiated from the antenna 30 is changed. Therefore, in the present embodiment, it is possible to perform the control of the beamforming by controlling the change of the height h of the meta-surface as described above. For example, the operating frequency of the meta-surface is very narrow so that the frequency may be effectively changed only by changing the height by a few mm, and consequently the radiation pattern of the meta-surface may be changed.

In the embodiment illustrated in FIG. 8, the height h of the meta-surface 10 is changed so as to uniformly maintain the separation distance between the meta-surface 10 and the opposite antenna 30 over the entire plane of the meta-surface 10. However, the present embodiment is not limited to this example.

For example, in the present embodiment, it is possible to change only a height of a part of the plurality of patches 12 constituting the meta-surface 10.

For example, in the present embodiment, among the plurality of patches 12 constituting the meta-surface 10, a height of the patch 12 arranged at the center and a height of the other patches 12 arranged at the outside may be relatively changed.

Also, in the embodiment illustrated in FIG. 8, the meta-surface 10 is configured as a flat plane. However, the present embodiment is not limited to this example.

For example, the meta-surface 10 may be configured as a concave curved surface. Alternatively, the meta-surface 10 may be configured as a convex curved surface. Alternatively, the meta-surface 10 may be configured as a more complicated curved surface that combines a concave curved surface and a convex curved surface in the three-dimensional space.

In addition, it is possible to combine the beamforming based on the control of the change of the height h of the meta-surface illustrated in FIG. 8 and the beamforming based on the control of the switching between on and off of the switches 20 illustrated in FIGS. 1 to 7. Accordingly, the present embodiment is possible to provide a more ideal control of the beamforming.

As described above, in the embodiments illustrated in FIGS. 1 to 9, each of the plurality of patches 12 constituting the meta-surface 10 is formed to have a square shape so as to have a regular tiling (or edge-to-edge tiling). However, the present embodiment is not limited to this example.

For example, the shape of the patch 12 may be formed to have a different shape for the regular tiling such as an equilateral triangle or a regular hexagon.

Furthermore, the shape of the patch 12 is not limited to the regular tiling.

For example, the shape of the patch 12 may be formed to have a quadrangle such as a rectangle, a rhomb, a trapezoid, or a parallelogram.

For example, the shape of patch 12 may be formed to have a polygon such as a triangular, a pentagonal, or a hexagonal.

In addition, the patch 12 may be formed to have a more complicated shape.

For example, the patch 12 may be formed to have a circular shape or elliptical shape.

For example, the patch 12 may be formed to have a semi-circular shape or semi-elliptical shape.

For example, the patch 12 may be formed to have a substantially L-shape or a substantially V-shape.

For example, the patch 12 may be formed to have a substantially C-shape or a substantially U-shape.

For example, the patch 12 may be formed to have a substantially cross shape or a substantially X-shape.

For example, the patch 12 may be formed to have a substantially T-shape or a substantially Y-shape.

Depending on the shape of the respective patches 12, the size of gap formed between the adjacent patches may be changed.

For example, in a case where the respective sides of the adjacent patches extend straight, the size of gap between the adjacent patches may be constant along a length of the side.

For example, in a case where the respective sides of the adjacent patches extend in a curved shape, the size of gap between the adjacent patches may be changed along a length of the side.

However, in order to achieve the energization in a good condition on the surface of the meta-surface 10, the size of gap between the adjacent patches is preferably small.

As described above, in the embodiments illustrated in FIGS. 1 to 9, each of the plurality of patches 12 constituting the meta-surface 10 has the same size, the same shape, and/or the same material. However, the present embodiment is not limited to this example.

For example, the plurality of patches 12 may not necessarily have the same size, the same shape, and/or the same material.

For example, among the plurality of patches 12 constituting the meta-surface 10, the patch 12 arranged at the center may be formed to have a different size, shape, and/or material in comparison with the other patches 12 which are arranged at the outside of the centrally arranged patch 12.

Figure 10:
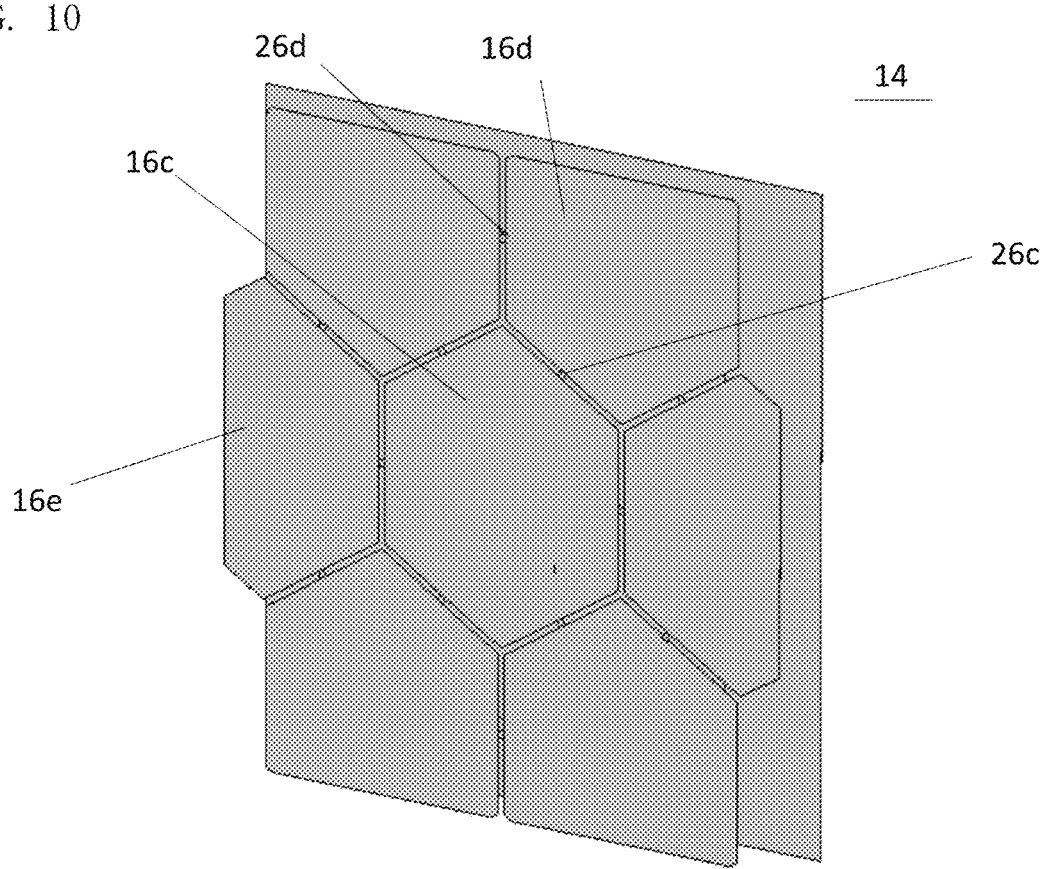
FIG. 10 illustrates an example showing a hexagon-type meta-surface (Example 1).

With referring to FIG. 10, a variation of the wireless power-supply device 1 having the meta-surface 10 which is formed by a plurality of patches 12 as illustrated in FIGS. 1 to 9 is exemplified.

With referring to FIG. 10, it is illustrated that a hexagonal (or honeycomb-type) meta-surface 14 includes a plurality of patches 16c, 16d, 16e in like manner.

In this case, the central patch 16c is formed to have a hexagonal (or honeycomb) shape. Each length of the respective sides of the hexagon is the same, and each angle formed by the two adjacent sides is the same.

In this example, the central patch 16c and the other patches 16d, 16e on the outer peripheral side which are arranged at the outside of the central patch 16c are provided to align the length, the position, and the angle of the adjacent sides. Preferably, the plurality of patches 16c, 16d, 16e are spaced apart from each other by a uniform size (or gap).

As illustrated in FIG. 10, the plurality of patches 16c, 16d, 16e constituting the meta-surface 14 are not necessary to be formed to have the same size and/or the shape.

For example, the shapes of the patches 16d, 16e arranged at the outside are made to be different when comparing to the shape of the central patch 16c. The six pieces of the patches 16d, 16e on the outer peripheral side are arranged along the six sides of the hexagon of the central patch 16c, but these patches are not necessary to be formed to have a perfect size of the hexagon.

For example, the patches 16d arranged in the up-down direction with respect to the central patch 16c and the patches 16e arranged in the left-right direction with respect to the central patch 16c may be formed to have different shapes.

For the plurality of patches 16c, 16d, 16e constituting the metal surface 14 of the hexagon-type, switches 26c, 26d may be arranged at the center of the sides of the hexagon. For example, the switches 26c may be arranged at the center of the six sides of the hexagon of the central patch 16c. In addition, with respect to the patches 16d, 16e on the outer peripheral side arranged at the outside of the central patch 16c, the switches 26d may be arranged at the center of the sides of the hexagons of the outer patches 16d, 16e. Each of the outer patches 16d, 16e on the outer peripheral side is formed to be cut off a part of the outer peripheral sides of the hexagon, thereby eliminating the need to bring the positions of the switches 26d from the center of the respective sides toward the outer periphery.

That is, in the embodiment illustrated in FIG. 2 (A), the positions of the switches 20 are changed according to the positions of the patches in order to energize the entire surface of the meta-surface 10.

On the other hand, in the embodiment illustrated in FIG. 10, the positions of the switches 26c, 26d are not changed, but the shapes of the patches 16c, 16d, 16e are changed to energize the entire surface of the meta-surface 14.

Accordingly, each switch is arranged at the center of the respective sides of the hexagons, and with such a configuration, the distance between the adjacent switches is made the longest. As a result, it becomes possible to suppress the occurrence of noise due to electric current flowing through the switch parts.

In addition, when comparing to the configuration illustrated in FIG. 2, the arrangement of the switches is evenly distributed on the meta-surface 10 so that the bias of each switch may be eliminated, and consequently, it is possible to realize a uniform radiation pattern.

Figure 11:
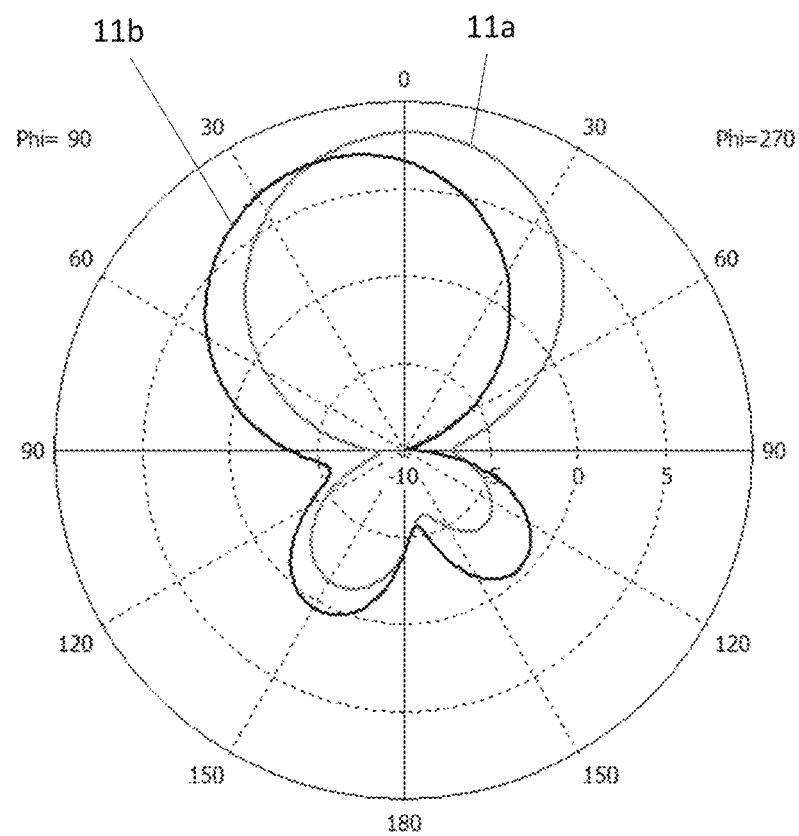
FIG. 11 illustrates an example showing a radiation pattern of the hexagon-type meta-surface of FIG. 10 (Example 1).

With referring to FIG. 11, examples of the radiation pattern of electromagnetic waves radiated from the antennae 30 to the outside are illustrated with regard to the meta-surface 14 of the hexagon-type illustrated in FIG. 10 when the energization condition of the respective switches 26c, 26d is changed.

The reference numeral 11a denotes a state in which all the switches 26c, 26d are supplied with power. In this case, the electromagnetic waves are radiated symmetrically in the left-right directions around a direction of 0 degree.

The reference numeral 11b denotes a state in which some of the switches 26c, 26d are supplied with power. In this case, the electromagnetic waves are radiated asymmetrically in the left-right directions to be biased leftward relative to the direction of 0 degree.

Therefore, it can be seen that the main lobe and the side lobe are changed by changing the state from 11a to 11b. As a result, the directivity of the antenna is changed. The same applies to changes in the front-rear ratio and the beam width.

As described above, even in the case of the meta-surface 14 of the hexagon-type illustrated in FIG. 10, the radiation pattern of the electromagnetic waves radiated from the antenna 30 to the outside may be changed similarly to the case of the meta-surface 10 illustrated in FIGS. 1 to 9.

In the embodiments described above with referring to FIGS. 1 to 11, the meta-surface 10 (or 14) consisting of the plurality of patches 12 (or 16c, 16d, 16e) is combined with the plurality of switches 20 (or 26c, 26d) to be used for the antenna 30. Accordingly, it is possible to perform the beamforming to realize various radiation patterns.

For example, in the present embodiment, in a case where the control of the beamforming is performed using twelve pieces of switches, there are 4096 (or the 12 power of 2) combinations of the switches.

According to the general phase controlled type beamforming, a phase shifter is added to the microwave oscillator 170 and the amplifier 190 illustrated in FIG. 1 to generate electromagnetic waves, and the beam direction is controlled by the control device 200. However, the control contents are limited. On the other hand, according to the present embodiment, the control device 200 is capable of performing the control of the radiation pattern of the electromagnetic waves radiated through the meta-surface 10. As a result, the versatility of the control is considerably enhanced.

The beamforming may be performed in various manners. In the present embodiment, the radiation pattern may be shifted by at least plus or minus 30 degrees.

In this case, it is possible to use a plurality of types of options such as the direction, the extent (or range), the shape, the size, the manner of branching, etc., of the electromagnetic waves.

Therefore, according to the present embodiment, it is possible to perform a fine adjustment of the beam.

Further, according to the present embodiment, it is possible to attain the small size and the light weight of the antenna. Therefore, it becomes possible to apply the antenna to a relatively small installation area.

For example, with referring to the Patent Document 1, it is described that "a metamaterial is used instead of the reflection element for guiding the incident transmission wave toward the vehicle outside (see PARA. 0015 and Claim 5)" with the aim to "effectively radiate the transmission wave radiated toward the inner end of the aperture to the vehicle outside (see PARA. 0015 and FIG. 11)."

According to the adjustment of the radiation path of the transmission wave described in the Patent Document 1, even though the radiation path of the transmission wave is adjusted, the application of the meta-material is extremely limited.

Also, according to the adjustment of the radiation path of the transmission wave described in the Patent Document 1, the meta-material is provided only at the predetermined position of the guide portion 55 (see PARA. 0075), but the way to control the state of power supply for a part of the meta-material is not described.

In addition, according to the adjustment of the radiation path of the transmission wave described in the Patent Document 1, the adjustment of the beam is limited, and for example, the reflected wave is only made to be guided to the outside of the vehicle to avoid the end edge portion 21 d (see PARA. 0073). In particular, this control is performed in the same manner as the general reflective element, and the configuration thereof is different from that of the present embodiment.

Further, according to the adjustment of the radiation path of the transmission wave described in the Patent Document 1, the meta-material is provided only at the projection 56 for holding the guide portion 55 (see PARA. 0072). Therefore, the distance between the antenna base 25 and the meta-material is relatively large and these two are not disposed close to each other. In addition, the relative positional relationship between the antenna base 25 and the meta-material is not allowed to be changed.

On the other hand, the present embodiments illustrated in FIGS. 1 to 11 enable to perform the beamforming with considerably enhanced versatility when comparing to the cases of the prior art such the Patent Document 1.

Example 2

Subsequently, a second embodiment of the wireless power-supply device will be described with referring to FIGS. 12 to 19.

Incidentally, the same or similar devices, components, parts, functions, and the like as those described in the first embodiment described with referring to FIGS. 1 to 11 are denoted by the same reference numerals, and the detailed descriptions will be omitted in order to avoid overlapped descriptions.

Figure 12:
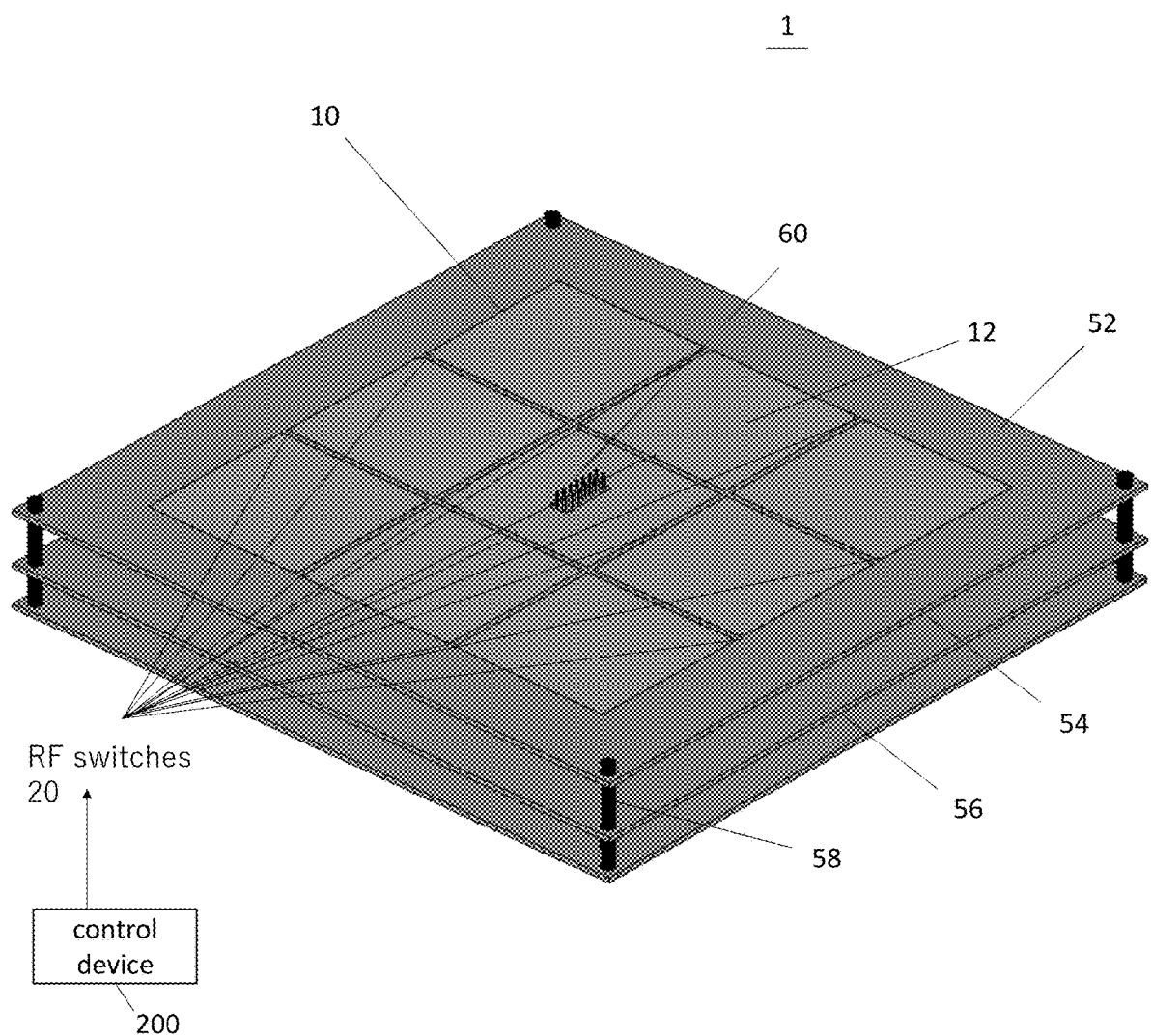
FIG. 12 illustrates an example showing a wireless power-supply device having a three-layered structure (Example 2).

With referring to FIG. 12, an example showing a perspective view of the wireless power-supply device 1 that constitutes a three-layered reconfigurable meta-surface is illustrated. As can be seen from the figure, the wireless power-supply device 1 comprises three substrates 52, 54, 56 in a laminated state. The substrates 52, 54, 56 is provided with the meta-surface 10 illustrated in FIG. 2 (B) and a wiring for energizing the meta-surface, and the like. Each substrate 52, 54, 56 is supported by posts 58 on the four corner sides. For example, each post 58 is made of Teflon®.

In FIG. 2 (B), it is illustrated that the radiation-side (or radiating elements) 30 of the antenna and the GND (or ground plate) 40 of the antenna are arranged in three layers. The three-layered structure for wiring illustrated in FIG. 12 is not necessary to exactly correspond to the three layers illustrated in FIG. 2 (B) in a one-to-one manner.

The substrate 52 of the uppermost layer of the three-layered structure is provided with the meta-surface 10 which is described with referring to FIGS. 1 to 11. A plurality of switches 20 are assigned to the meta-surface 10 to control the energization condition of the plurality of patches 12. The voltage (V1) for controlling the respective switches 20 is controlled by the control device 200. Therefore, the control device 200 is capable of unitarily and freely controlling the combinations of ON/OFF control of the respective switches. The control device 200 may be, for example, a single-board computer equipped with a processor. The control device 200 may be, for example, a Raspberry Pi® or the like. The control device 200 may be incorporated in the three-layered structure illustrated in FIG. 12 or may be provided outside the three-layered structure.

On the substrate 54 of the intermediate layer in the three-layered structure, a wiring connector 60 for bundling the wirings for controlling the respective switches 20 is provided at the center of the substrate 54. In FIG. 12, the wiring connector 60 is depicted so as to be visible through the uppermost layer so that the relative position and size of the wiring connector may be seen. The wirings are made to extend from the wiring connector 60 to each of the plurality of switches 20.

Figure 13:
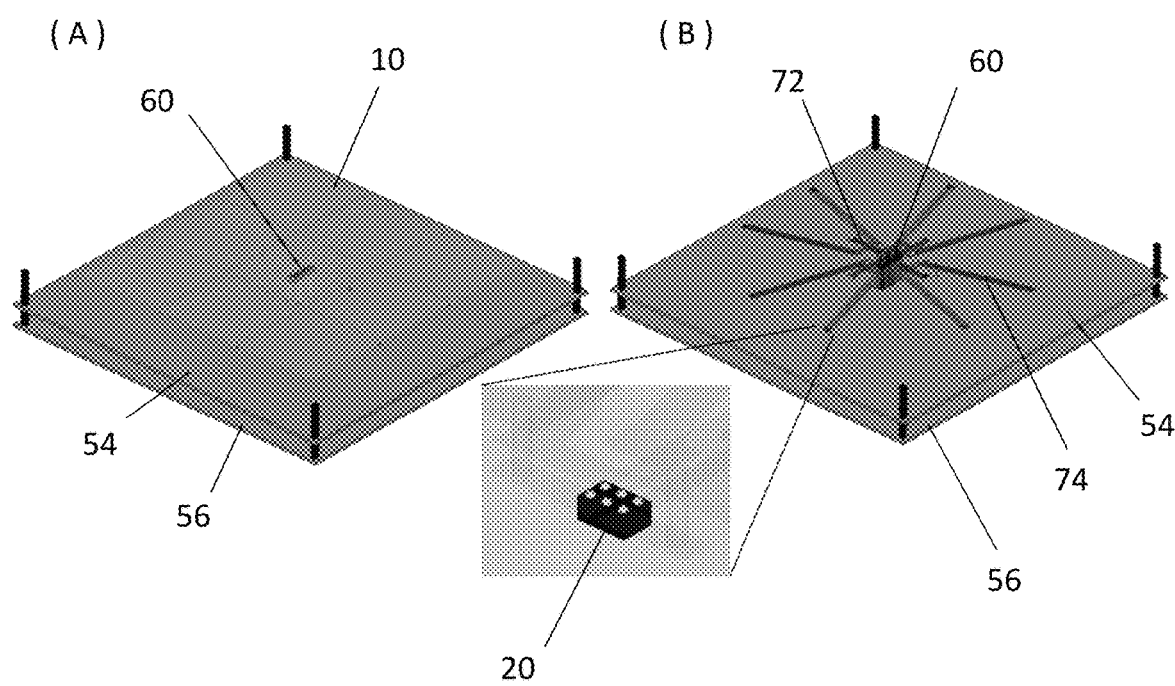
FIG. 13 illustrates an example showing a state of the intermediate layer when the uppermost layer of the three-layered structure illustrated in FIG. 12 is removed, in (A) and (B) (Example 2).

With referring to FIG. 13, the condition of the substrate 54 of the intermediate layer of the wireless power-supply device 1 of FIG. 12 is illustrated, divided into (A) and (B), when the substrate 52 of the uppermost layer is removed.

With referring to FIG. 13 (A), the meta-surface 10 is shown in an overlapped manner so that the relative positions and sizes can be seen.

With referring to FIG. 13 (B), the meta-surface 10 is removed so that the condition of the wiring of the wiring connector 60 can be seen.

As exemplified with referring to FIG. 2 (A), the positions of the switches 20 may be changed according to the positions of the patches 12. This is done to efficiently energize the surface of the meta-surface 10 with the required minimum number of the switches 20.

For example, the patch 12 arranged at the center is provided with the switches 20 at each center of the respective sides of the square shape.

For example, the patch 12 arranged on the outer peripheral side is provided with the switches 20 at each outer peripheral side of the sides of the square shape.

Therefore, there may be two types of the wirings which are made to extend from the wiring connector 60 toward the respective switches.

For example, as denoted by the reference numeral 72 in FIG. 13 (B), there are four wirings extending from the wiring connector 60 arranged at the center toward each center of the respective sides of the square shape of the patch 12 arranged at the center, at a relatively short distance.

For example, as denoted by the reference numeral 74 in FIG. 13 (B) there are eight wirings 74 extending from the wiring connector 60 arranged at the center toward each outer peripheral side of the respective sides of the square shapes of the patches 12 arranged at the outer periphery.

These wirings 72, 74 are regularly arranged in accordance with the arrangement of the plurality of patches 12 constituting the meta-surface 10.

As can be seen from FIG. 13 (B), the wires 72, 74 are provided to linearly extend from the wiring connector 60 arranged at the center toward the periphery so as not to be overlapped with each other in the same direction or at the same angle.

Also, the wirings 72, 74 are provided to extend from the wiring connector 60 arranged at the center toward the periphery so as to have a relatively large space (or gap) between the adjacent wirings, respectively. Therefore, the wirings 72, 74 are provided to reduce the occurrence of the interference between the adjacent wirings.

As can be seen from the figure, the high-frequency switches 20 are connected to each end portion of the respective wirings 72, 74 extending from the wiring connector 60.

Figure 14:
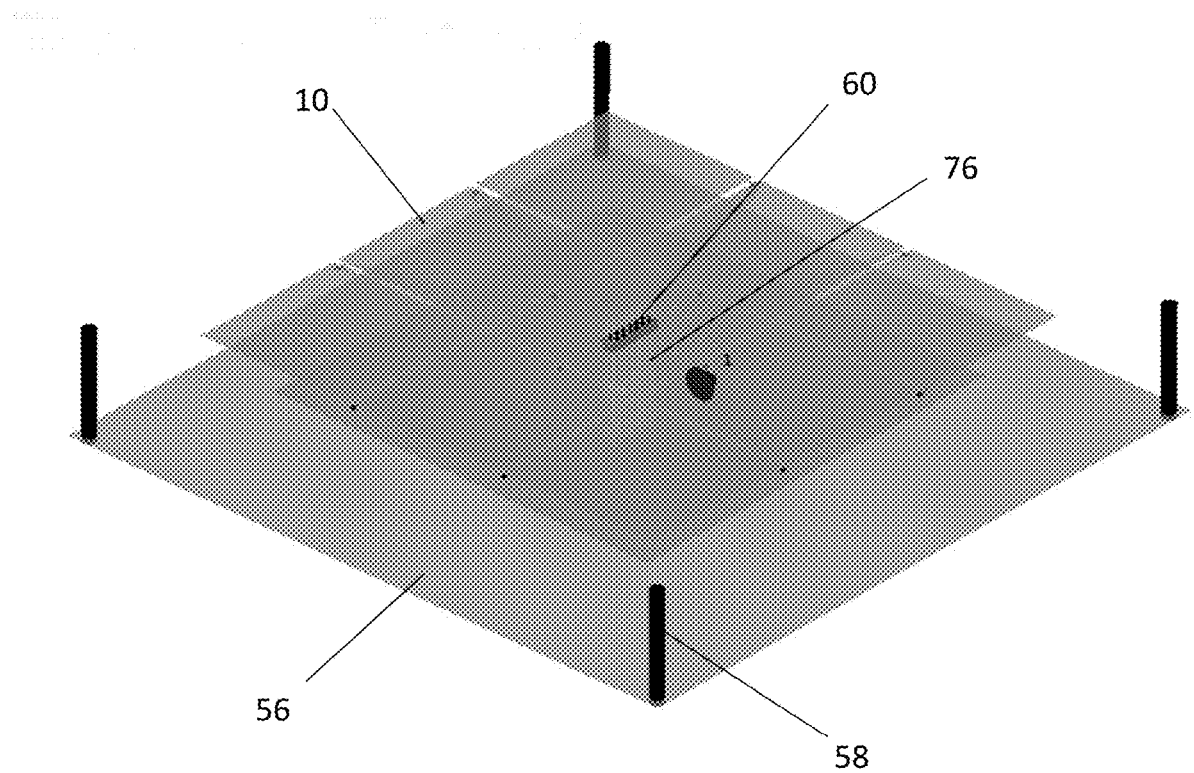
FIG. 14 illustrates an example showing a state of the lowermost layer when the uppermost layer and the intermediate layer of the three-layered structure illustrated in FIG. 12 are removed (Example 2).

With referring to FIG. 14, a condition of the substrate 56 at the lowermost layer of the wireless power-supply device 1 of FIG. 12 is illustrated when the uppermost substrate 52 and the intermediate substrate 54 are removed.

In this case, the meta-surface 10 and the wiring connector 60, and the like are shown in an overlapped manner so that the relative positions and sizes can be seen.

As described above, the wiring connector 60 is provided to individually control the energization condition of the respective switches 20 by extending the respective wirings 72, 74 toward the twelve switches 20. Accordingly, as denoted by the reference numeral 76, twelve wirings are made to collectively extend from below of the wiring connector 60 toward the substrate 56 at the lowermost layer. The supply of voltage through these wirings 76 is controlled by the control device (illustrated in FIG. 12) which is disposed below the substrate 56.

Hereinafter, a condition of the wiring of the respective switches 20 will be described in more detail.

Figure 15:
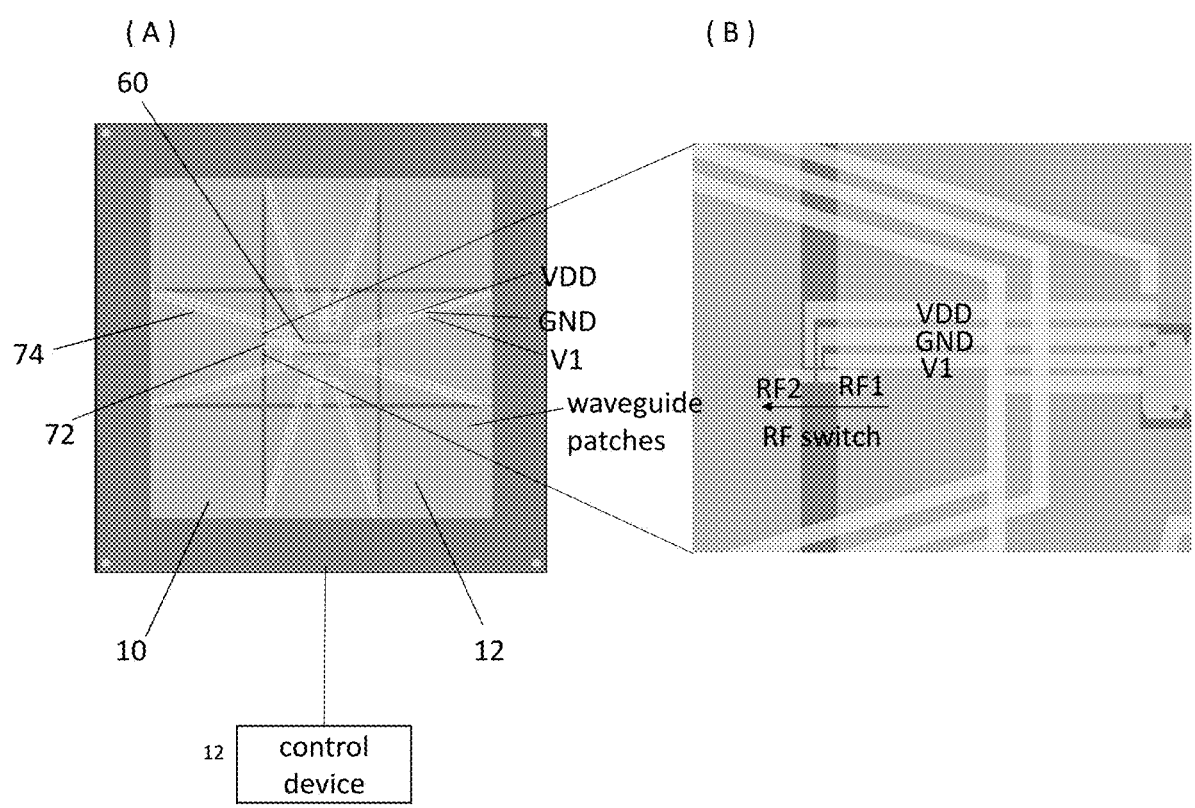
FIG. 15 illustrates an example showing a state of wiring of the wireless power-supply device having the three-layered structure illustrated in FIG. 12 (Example 2).

With referring to FIG. 15 (A), (B), the wirings 72, 74 extending from the wiring connector 60 are illustrated in more detail.

FIG. 15 (A) depicts an example showing a front view of the configuration illustrated in FIG. 12.

FIG. 15 (B) depicts an example showing an enlarged view of a part of the wirings illustrated in FIG. 15 (A).

With referring to FIG. 15 (B), it is illustrated that a part referred to as a RF switch corresponds to one of the high-frequency switches denoted by the reference numeral 20 in FIG. 12. One high-frequency switch 20 is arranged to bridge the two patches 12, 12 adjacent to each other. One high-frequency switch 20 is capable of supplying electric power at the same time to the corresponding parts of the two adjacent patches 12, 12 so that it is possible to refer it as a set of two high-frequency switches (RF1 and RF2).

Incidentally, in the illustrated example, one high-frequency switch 20 supplies electric power to two adjacent patches 12, 12, but the present embodiment is not limited to this example. For example, one high-frequency switch 20 may supply electric power to one patch 12.

As illustrated in FIG. 15 (A), (B), twelve wirings 72, 74 are provided to extend from the wiring connector 60 toward the respective high-frequency switches 20. A single wiring (72 or 74) may be composed of three wires. These three wires may be wrapped in an arbitrary material, such as resin, so as to be combined together as a single wiring (72 or 74).

With referring to FIG. 15 (B), three wires are made to extend from the wiring connector 60 in the state of being combined with each other, toward one high-frequency switch 20. One of the three wires (for example, one located at the center in FIG. 15 (B)) corresponds to a GND (or ground) to represent a part where the difference from the reference potential in the circuitry becomes "0 V (or 0 volt)". The remaining two of the three wires correspond to a wire that supplies voltage (V1) for controlling ON/OFF of the switch and a wire that supplies power supply voltage (Vdd), respectively.

In this way, it is possible to arbitrarily switch the energization condition of each one of the high-frequency switches 20, using the wiring (72 or 74) which is consisting of three wires. As described above, one high-frequency switch 20 is capable of switching the power supply status of the corresponding parts of the two adjacent patches 12 at the same time, and thus it is possible to refer the high-frequency switch 20 as one set of two switches (RF1 and RF2).

Figure 16:
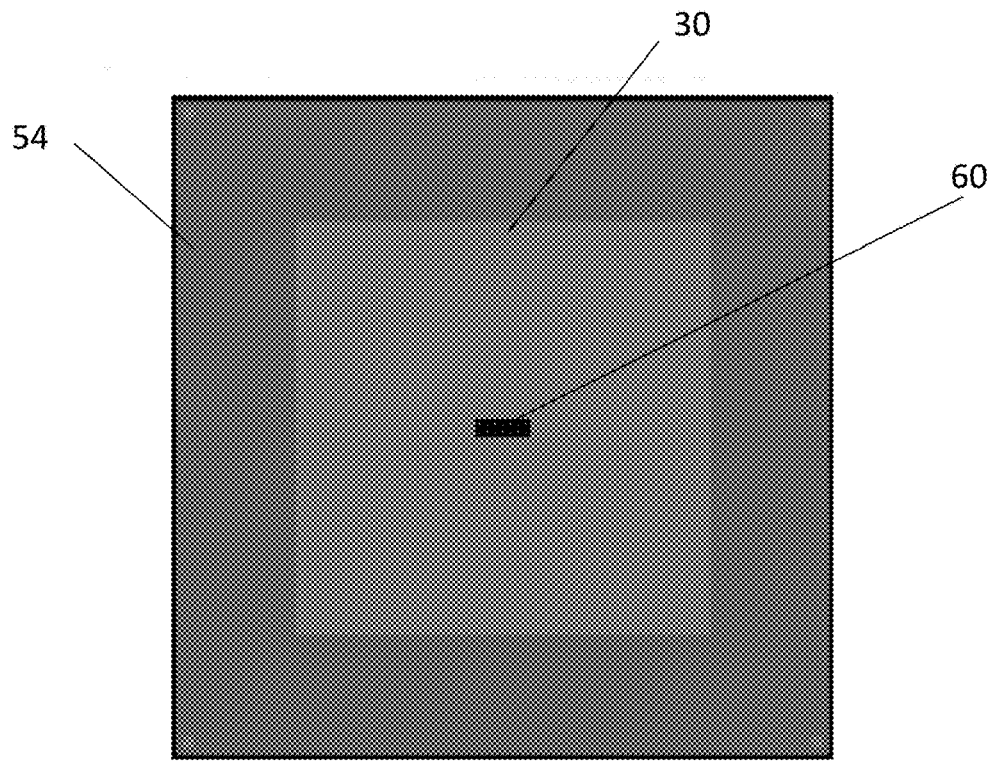
FIG. 16 illustrates an example when the intermediate layer of the three-layered structure illustrated in FIG. 12 is removed (Example 2).

With referring to FIG. 16, the substrate 54 of the intermediate layer (or middle layer) in the three-layered structure illustrated in FIG. 12 is illustrated in isolation.

Figure 17:
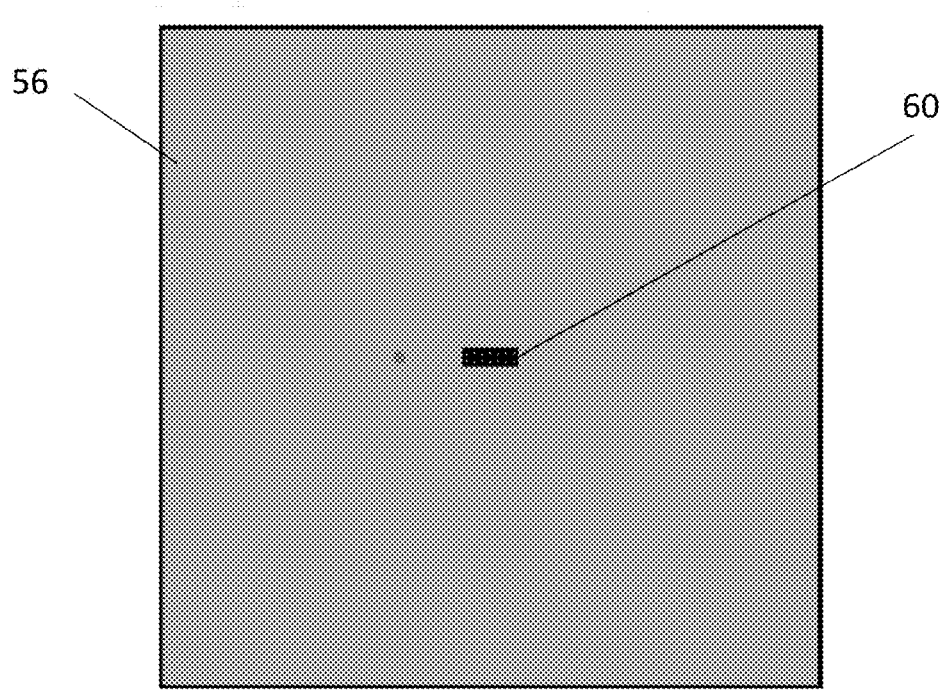
FIG. 17 illustrates an example when the lowermost layer of the three-layered structure illustrated in FIG. 12 is removed (Example 2).

With referring to FIG. 17, the substrate 56 of the lowermost layer (or bottom layer) in the three-layered structure illustrated in FIG. 12 is illustrated in isolation.

The antenna 30 is accommodated in the three-layered structure as illustrated in FIG. 2. When arranging the antenna 30, the position in the height direction of the antenna 30 may be deviated from the respective substrates 54, 56 in order to avoid the occurrence of the interference with the wirings 72, 74 of the wiring connector 60.

So far, the configuration example of the wireless power-supply device 1 has been schematically described with referring to FIGS. 12 to 17.

Figure 18:
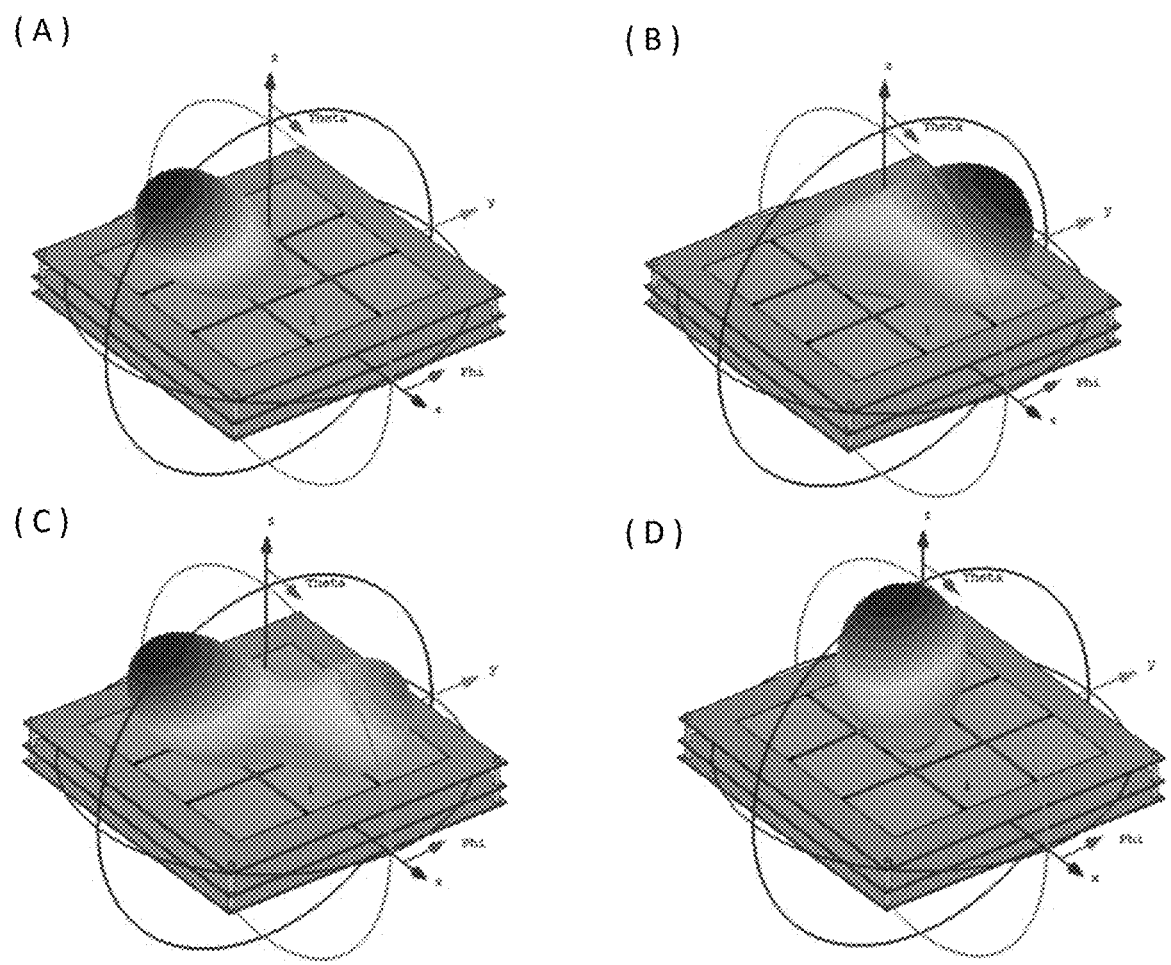
FIG. 18 illustrates an example of a radiation pattern of the wireless power-supply device having the three-layered structure illustrated in FIG. 12 (Example 2).

With referring to FIG. 18, four examples of the radiation pattern are illustrated in (A) to (D) among a plurality of radiation patterns which are configured by the combination of the respective switches 20, with regard to the wireless power-supply device 1 illustrated in FIGS. 12 to 17, For example, in FIG. 18 (A), some of the switches are turned on so that the electromagnetic waves radiated from the antennas are not radiated straight up in the three-dimensional space, but are biased leftward when being radiated.

For example, in FIG. 18 (B), some of the switches are turned on so that the electromagnetic waves radiated from the antennas are not radiated straight up in the three-dimensional space, but are biased rightward when being radiated.

For example, in FIG. 18 (C), some of the switches are turned on so that the electromagnetic waves radiated from the antennas are not radiated straight up in the three-dimensional space, but are divided into two pieces of the right and left sides when being radiated.

For example, in FIG. 18 (D), all the switches are turned on, and the electromagnetic waves radiated from the antennas are radiated straight up in the three-dimensional space.

Therefore, when the electromagnetic waves are radiated from the antenna from the surface (X axis, Y axis) of the meta-surface 10 toward the upper side (Z axis) in the three-dimensional space, the radiation pattern of the electromagnetic waves may be according to either of a case where the electromagnetic waves are directed straight in the vertical direction or a case where the electromagnetic waves are directed obliquely upward.

Also, it is possible to distinguish the direction, on the surface (X-axis, Y-axis) of the meta-surface 10, at the top side, at the right side, at the bottom side or at the left side. Alternatively, it is possible to distinguish the direction, on the surface (X-axis, Y-axis) of the meta-surface 10, at the upper right side, at the lower right side, at the upper left side, or at the lower left side. Alternatively, it is possible to distinguish the direction, on the surface (X-axis, Y-axis) of the meta-surface 10, at every 45 degrees, at every 30 degrees, or at finer intervals.

The radiation pattern of the electromagnetic waves radiated from the antenna may be directed straight in the vertical direction as a form of one piece, from the surface (X-axis, Y-axis) of the meta-surface 10 toward the upward (Z-axis) in the three-dimensional space (see FIG. 18 (D)).

Alternatively, the radiation pattern of the electromagnetic waves radiated from the antenna may be directed straight in the vertical direction as a form which is divided into two pieces, from the surface (X-axis, Y-axis) of the meta-surface 10 toward the upward (Z-axis) in the three-dimensional space (see FIG. 18 (C)).

It is also possible to divide the radiation pattern into two or more pieces. When the radiation pattern is divided into two or more pieces, the directions of the respective pieces may be opposite to each other (in which the angle formed between the two pieces is an obtuse angle). Alternatively, the directions of the respective pieces may be directed mutually close to each other (in which the angle formed between the two pieces is an acute angle).

In addition, it is also possible to variously change the size and the manner of extending (or spreading) of the radiation pattern of the electromagnetic waves radiated from the antenna.

Figure 19:
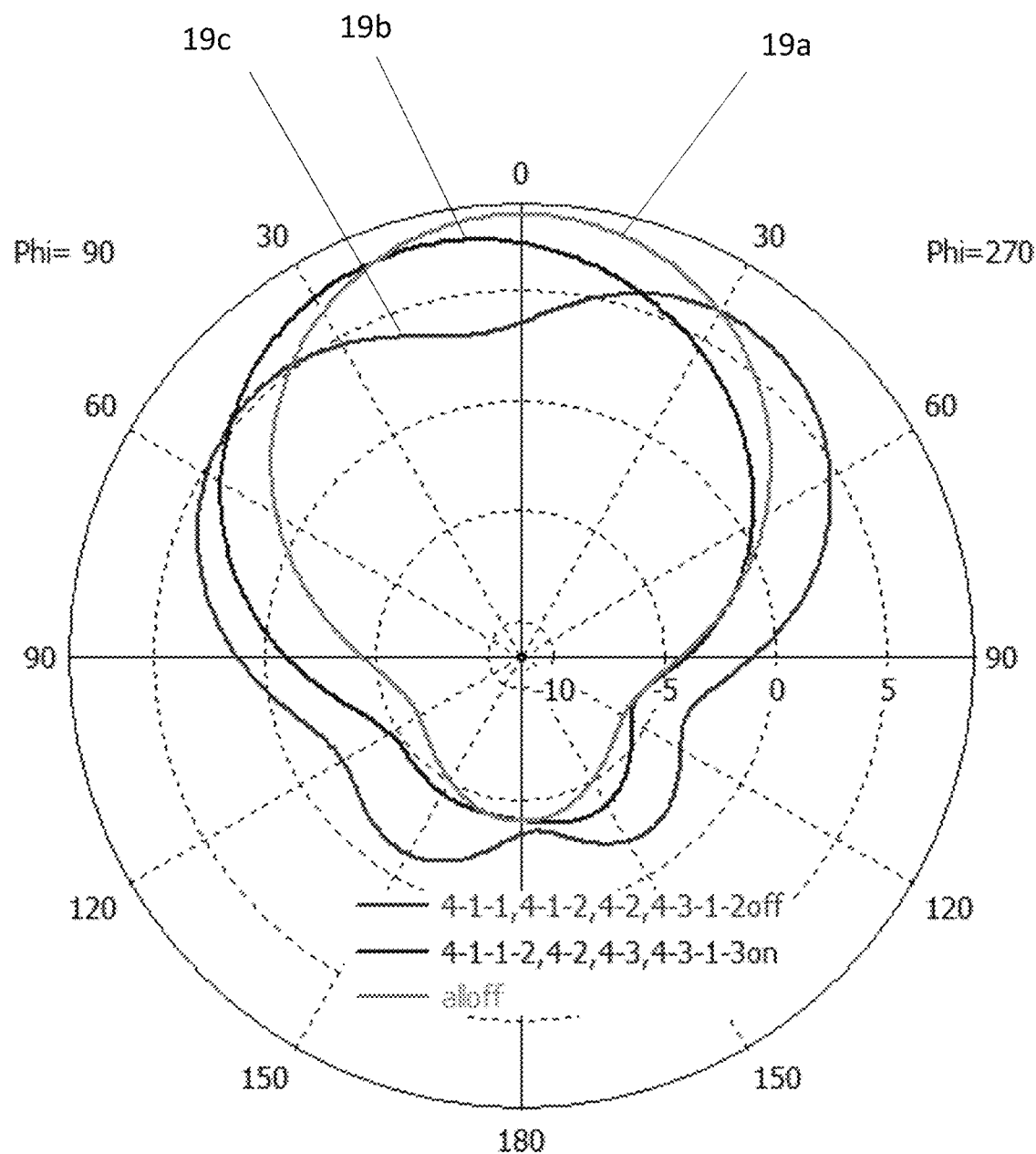
FIG. 19 illustrates an example of a radiation pattern of the wireless power-supply device having the three-layered structure illustrated in FIG. 12 (Example 2).

FIG. 19 depicts an example in which three examples of radiation pattern are shown in an overlapped manner with respect to the wireless power-supply device 1 illustrated in FIGS. 12 to 17.

For example, in the state denoted by the reference numeral 19a, all the switches are turned on, and the electromagnetic waves radiated from the antenna are radiated symmetrically in the left-right directions around a direction of 0 degree (see FIG. 18 (D)).

For example, in the state denoted by the reference numeral 19b, some of the switches are turned on, and the electromagnetic waves radiated from the antenna are radiated to be biased leftward relative to the direction of 0 degree (see FIG. 18 (A)).

For example, in the state denoted by the reference numeral 19c, some of the switches are turned on, and the electromagnetic waves radiated from the antennas are radiated to be divided into two pieces of the left and right sides relative to the direction of 0 degree (see FIG. 18 (C)).

As can be seen from the results of FIGS. 18, 19, it is possible to control the extend (or spreading) of the radiation pattern with respect to the direction and the size, and the like, relatively finely.

Accordingly, in the second embodiment illustrated in FIGS. 12 to 19, as in the case of the first embodiment illustrated in FIGS. 1 to 11, it is possible to perform the beamforming with considerably enhanced versatility when comparing to the cases of the prior art such as described in the Patent Document 1.

The results of FIGS. 18, 19 are obtained by simulations performed on a computer using a mathematical model. At this time, the states at the time of power supply are required under an ideal condition in which there is no obstacle or disturbance etc., but it is possible to estimate that the actual state is almost the same.

Example 3

Subsequently, a third embodiment of the wireless power-supply device 2 will be described with referring to FIGS. 20 to 28.

Incidentally, the same or similar devices, components, parts, functions, and the like as those described in the first embodiment described with referring to FIGS. 1 to 11 are denoted by the same reference numerals, and the detailed descriptions will be omitted in order to avoid overlapped descriptions.

In addition, the same or similar devices, components, parts, functions, and the like as those described in the second embodiment described with referring to FIGS. 12 to 19 are denoted by the same reference numerals, and the detailed descriptions will be omitted in order to avoid overlapped descriptions.

In the third embodiment, the control device 200 is devised with respect to the radiation of electromagnetic waves generated at the side of the transmitting device Tx (see FIG. 1). The transmitting device Tx has an arbitrary configuration for generating the electromagnetic waves and may include, for example, the microwave oscillator 170, the amplifier 190, and the control device 200 (see FIG. 1).

Figure 20:
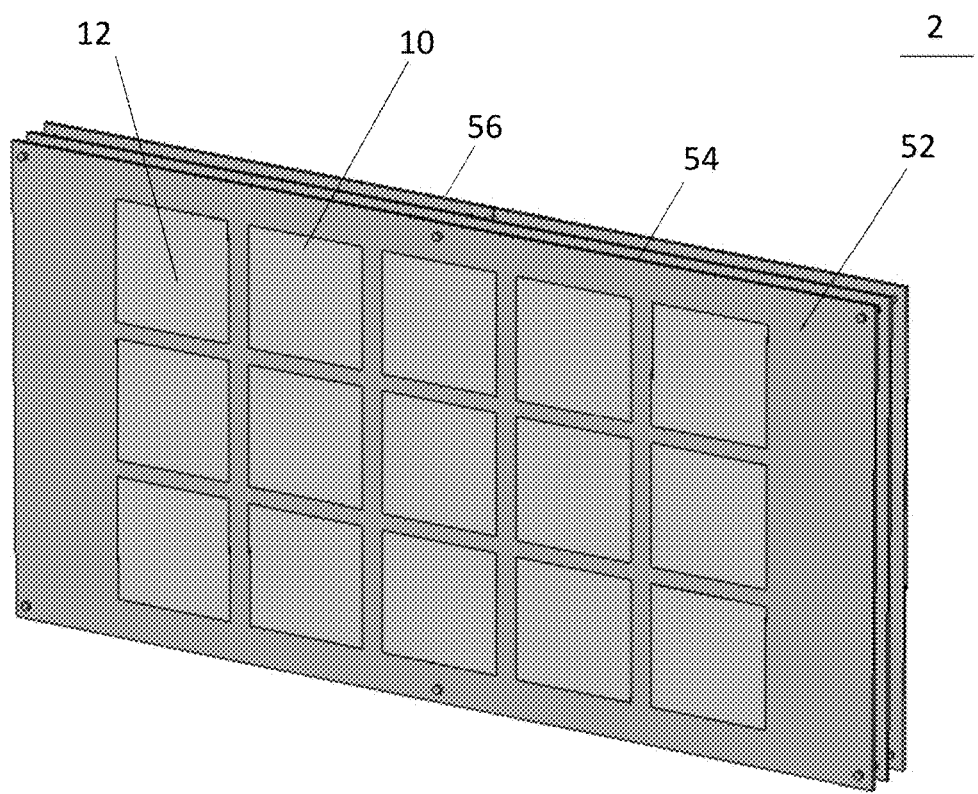
FIG. 20 illustrates an example of a perspective view of a wireless power-supply device including a meta-surface having an array of 3×5 (Example 3).

With referring to FIG. 20, the wireless power-supply device 2 may include three substrates 52, 54, 56, similar to the case of the three-layered structure illustrated in FIG. 12. The wireless power-supply device 2 also includes a plurality of patches 12 constituting the meta-surface 10 on the substrate 52 of the uppermost layer. In this case, the m×n array of the patches 12 is elongated along a vertical or horizontal direction For example, in the example 3 illustrated in FIG. 20, the meta-surface 10 has a total of fifteen pieces of patches 12 in the array of 3 rows x 5 columns.

Figure 21:
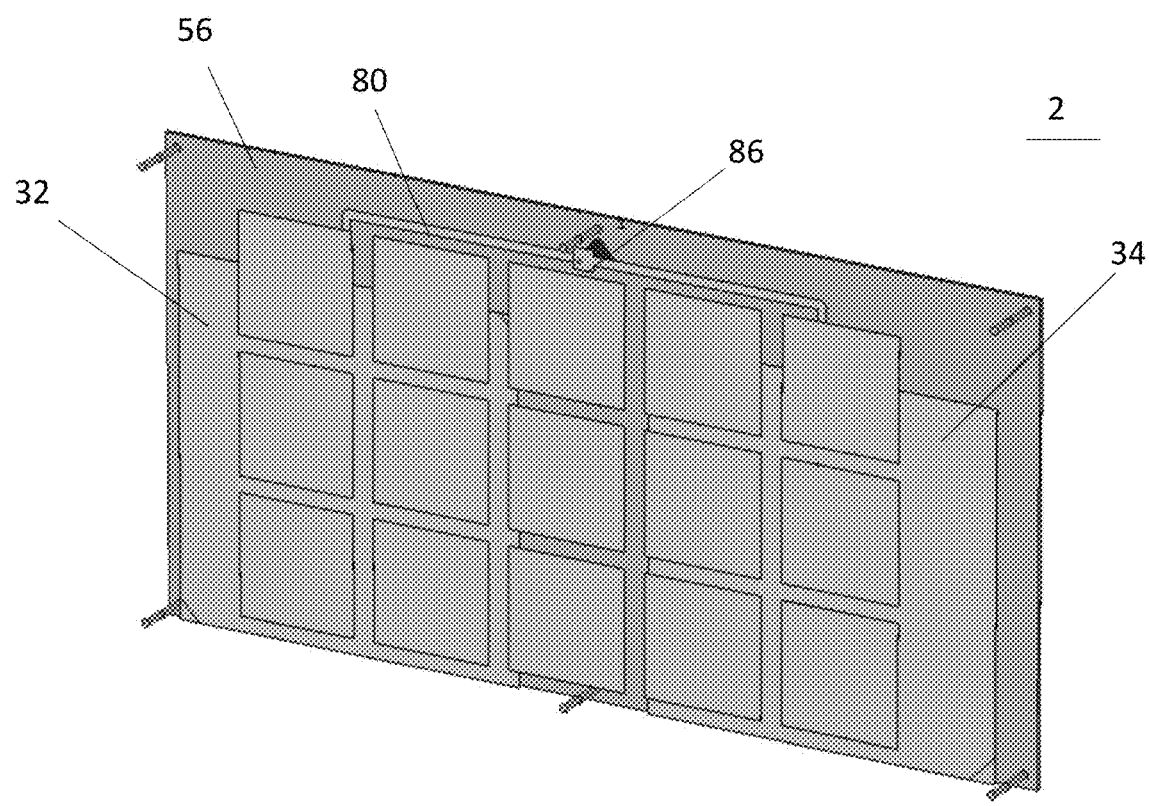
FIG. 21 illustrates an example showing a state of the lowermost layer when the uppermost layer and the intermediate layer of the three-layered structure illustrated in FIG. 20 are removed (Example 3).

FIG. 21 illustrates a condition in which the substrate 52 of the uppermost layer and the substrate 54 of the intermediate layer are removed in the three-layered structure of the wireless power-supply device 2 illustrated in FIG. 20 in order to clearly show the relative relationships between the plurality of antennas 32, 34 and the meta-surface 10 accommodated in the three-layered structure.

In the configuration illustrated in the figure, two patch antennas 32, 34 are juxtaposed according to the m×n array of the patches 12 that is vertically or horizontally elongated. Each patch antenna 32, 34 is connected by a single wiring as denoted by the reference numeral 80, and its connecting portion 86 is provided at the center.

Figure 22:
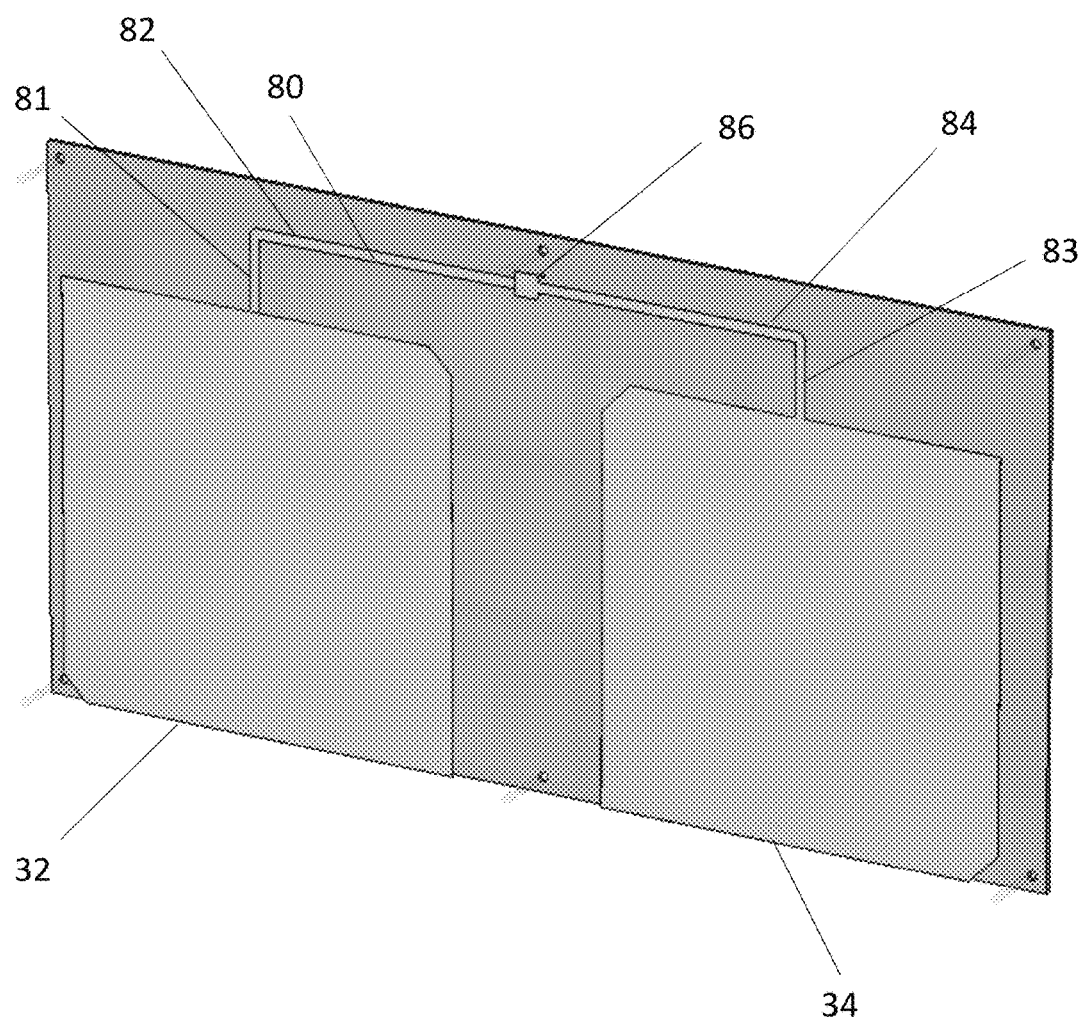
FIG. 22 illustrates an example showing a state of the two antennas used in the three-layered structure illustrated in FIG. 20 (Example 3).

With referring to FIG. 22, the two patch antennas 32, 34 illustrated in FIG. 21 are more clearly illustrated.

The connecting portion 80 is configured to include a relatively long extended portions 82, 84 extending in parallel with the juxtaposing direction of the two antenna 32, 34 for connecting them, and portions 81, 83 which are bent at an approximately right angle for connecting the corresponding antenna 32, 34. The connecting portion 80 may be divided into two parts at a central connecting part 86, and the two parts are mutually in a mirror image relationship. Accordingly, the connecting portion 80 is formed to have a substantially U-shape as a whole.

With referring to FIG. 22, the connecting portions 80 having a substantially U-shape for connecting the two patch antennas 32, 34 are collectively arranged while being deviated to one side (or upper side in FIG. 22).

When electric current flows through a conductor, a magnetic field is generated around the conductor as a result of the magnetic action. Thus, when electric current flows through the connecting portion 80 for connecting the two patch antennas 32, 34, a magnetic field is generated while being deviated to the upper side in FIG. 22, with respect to the two patch antennas 32, 34. This phenomenon may be undesirable in some cases.

Accordingly, this embodiment is provided with a means for avoiding or reducing this phenomenon.

Figure 23:
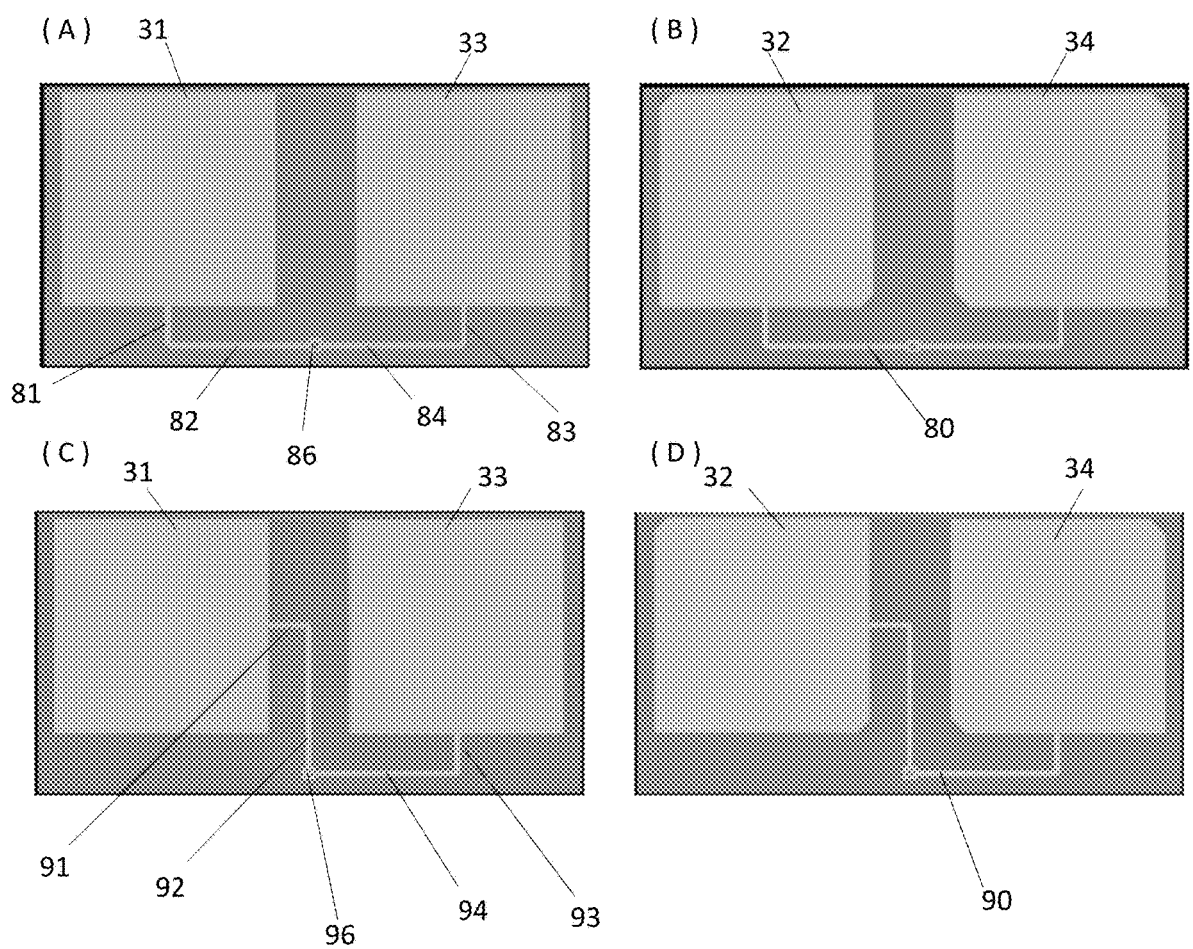
FIG. 23 illustrates an example showing a state of the connection of the two antennas illustrated in FIG. 22, in (A) to (D) (Example 3).

With referring to FIG. 23 (A) to (D), the above-mentioned two patch antennas and the connecting portion are illustrated in detail.

In FIG. 23 (A), patch antennas 31, 33 each having a general square shape are juxtaposed with each other. The respective patch antennas 31, 33 may be configured to perform the same function.

In FIG. 23 (B), patch antennas 32, 34 capable of performing different functions for right-handed rotatory polarized waves and left-handed rotatory polarized waves are juxtaposed with each other. In this case, one set of the patch antennas 32, 34 may correspond to clockwise radio waves and counterclockwise radio waves opposite thereto.

For example, when it is required to prevent the occurrence of the interference of radio waves, the embodiment illustrated in FIG. 23 (B) is preferable to the embodiment illustrated in FIG. 23 (A).

As illustrated in FIG. 23 (A), (B), the above-mentioned patch antennas 31, 33 and the patch antennas 32, 34 may be connected with each other by the connecting portion 80 illustrated in FIG. 22. In this case, two adjacent patches may be connected at the shortest distance. However, when electric current flows through the connecting portion 80, a magnetic field may be generated to be biased to the lower side in FIG. 23 with respect to the two patch antennas 32, 34.

With referring to FIGS. 23 (C) and (D), a connecting portion 90 improved a way to make a route of the connecting portion 80 illustrated in FIG. 22 in order to avoid or reduce the above-mentioned problems resulting from the magnetic action is illustrated.

With referring to FIGS. 23 (C) and (D), the connecting portion 90 is configured to have portion 92, 94 proceeding in a zigzag pattern (for example, formed by bending at a right angle) in order to connect the two juxtaposed patch antennas. In other words, the connecting portion 90 is configured to have a portion 94 extending in parallel with the juxtaposing direction of the two antennas 32, 34, and a portion 92 extending in a direction orthogonal thereto, instead of the straight extending portions 82, 84 of the connecting portion 80. The two portions 92, 94 are connected in a zigzag pattern at a central connecting part 96 of the connecting portion 90.

In this way, by rotating the directions of the respective patch antennas 31, 33 by 90 degrees, it becomes possible to radiate the transversal polarized waves (or horizontal polarized waves) from the patch antenna 31 and the longitudinally polarized waves (or vertical polarized waves) from the patch antenna 33.

The connecting portion 90 includes portions 91, 93 which are folded substantially at a right angle to be connected with the corresponding antennas 32, 34 (or 31, 33) on the end side of the two portions 92, 94. The extending directions of the two portions 91,93 are made to be perpendicular to each other.

The connecting portion 90 may be divided into two parts at a central connecting part 96, but the two parts are not mutually in a mirror image relationship. The connecting portion 90 is formed in a substantially half part of a swastika shape, as a whole, instead of a substantially U-shape.

Accordingly, the route direction of the connecting portion 90 is changed at a right angle along at least a part of the substantially swastika shape.

In this way, the connecting portion 90 is formed to change the direction of the transmission line for connecting the adjacent two antennas 32, 34 (or 31, 33) in order to prevent the occurrence of unevenly distributed magnetic field due to electric current flowing along this route. Preferably, the connecting portion 90 is made to extend along a substantially half part of a swastika shape so that the magnetic fields generated at the portion 91 and the portion 94 cancels each other, or the magnetic fields generated at the portion 92 and the portion 93 cancels each other. As a result, it becomes possible to reduce the influence of electric current flowing through the connecting line.

Therefore, the rotation symmetry when viewed in the shape is guaranteed by forming it into a swastika shape. Here, it is possible to radiate each of the longitudinally polarized waves (or vertical polarized waves) and the transversal polarized waves (or horizontal polarized waves) by rotating it in a swastika shape.

Figure 24:
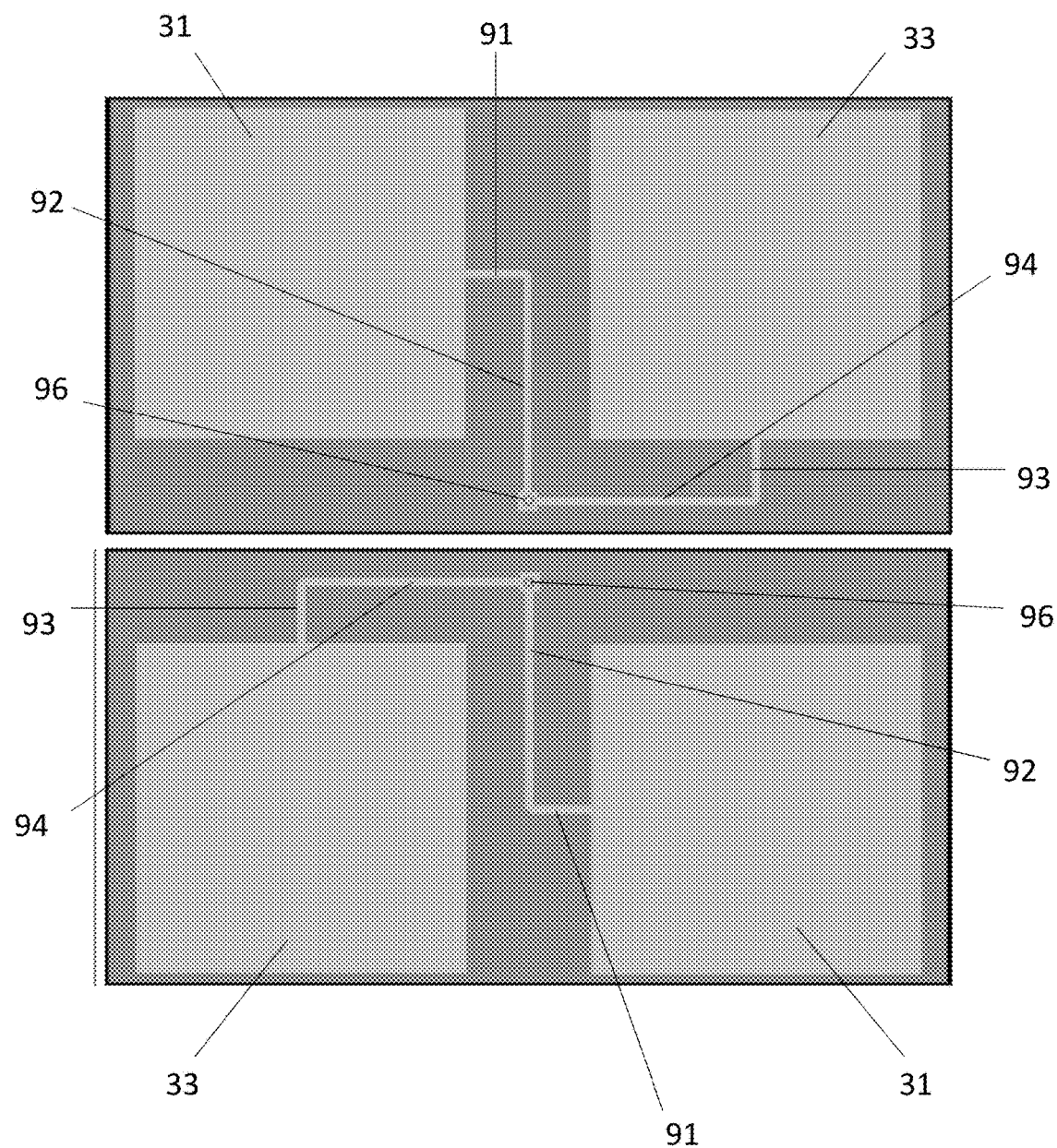
FIG. 24 illustrates an example showing a state of the connection of the four antennas along a swastika shape (Example 3).

With referring to FIG. 24, further improvements in the combination of the two patch antennas and the connecting portion 90 illustrated in FIG. 23 (C) and (D) in order to prevent the occurrence of unevenly distributed magnetic field are illustrated.

According to the configuration illustrated in FIG. 24, two sets of the combination of the two patch antennas and the connecting portion 90 illustrated in FIG. 23 (C) are prepared and arranged in parallel vertically. At this time, the lower set is arranged by turning at 180 degrees in a direction with respect to the upper set (the configuration illustrated in FIG. 23 (C)). As a result, the two connecting portions 90 are centrally disposed on the center side of the four patch antennas, and the two connecting portions 90 are arranged to form a substantially swastika shape as a whole.

According to the configuration illustrated in FIG. 24, in particular, the two vertically extending portions 92, 92 and the two horizontally extending portions 94, 94 are orthogonal to each other. In addition, the two vertically extending portions 93, 93 and the two horizontally extending portions 91, 91 are orthogonal to each other, at a shorter distance.

In this way, the two connecting portions 90 are arranged along a substantially swastika shape. In this case, when electric current flows through a conductor, a magnetic field is generated around the conductor as a result of the magnetic action, but the magnetic field cancel each other along the substantially swastika shape as a whole so that the occurrence of unevenly distributed magnetic field is avoided or reduced.

Incidentally, in FIG. 24, the two connecting portions 90 may be provided in close proximity to each other or overlapped with each other so as to share one central connecting part 96.

Figure 25:
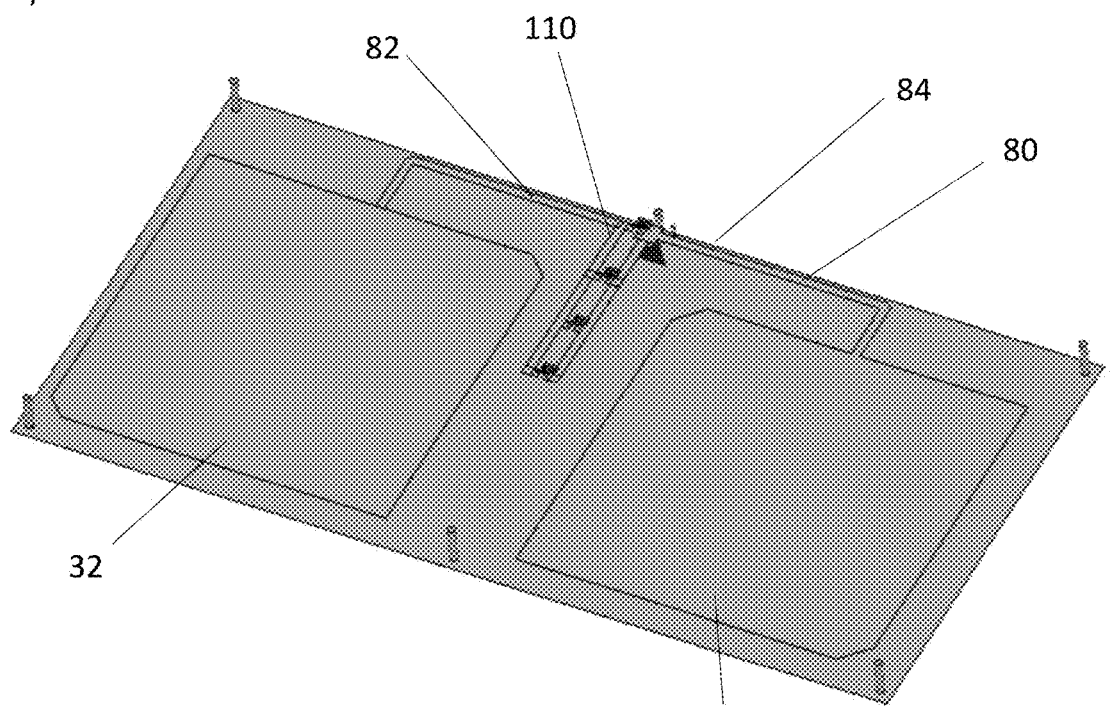
FIG. 25 illustrates an example in which the connection route of the two antennas illustrated in FIG. 22 is made to be selectable in stages by using switches and a branch portion, in (A) and (B) (Example 3).
Figure 25:
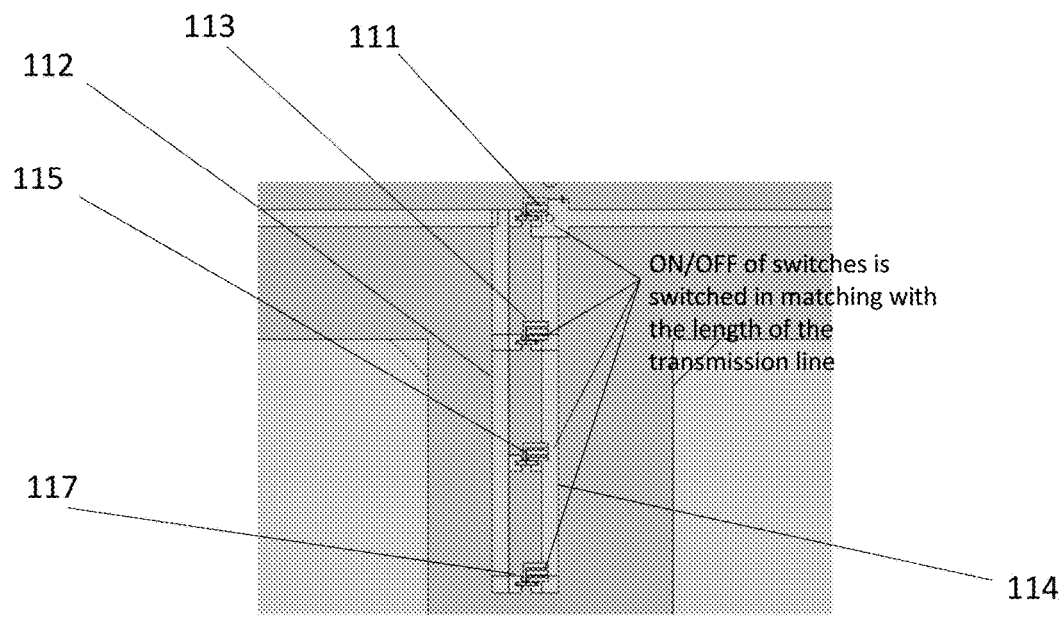

With referring to FIG. 25 (A), (B), it is exemplified that the present embodiment is provided with a means (branch portion) 110 for adjusting the phase advance or phase delay of the alternating current when the two antennas 32, 34 are supplied with power through the connecting portion 80.

FIG. 25 (A) depicts an example of a modified embodiment as opposed to the embodiment illustrated in FIG. 22.

FIG. 25 (B) depicts an enlarged view of the main part of FIG. 25 (A).

As mentioned above, the two antennas 32, 34 are connected by a connecting portion 80 having a predetermined route length. In this case, it is possible to change the phases of beams radiated from the two antennas 32, 34 by shifting the feeding timing when the two antennas 32, 34 are supplied with power along the route of the connecting portion 80.

With referring to FIG. 25 (A), (B), the present embodiment makes it possible to address such problems by adding a branch portion 110 to the connecting portion 80.

With referring to FIG. 25 (A), (B), the branch portion 110 of the present embodiment is provided with four switches 111, 113, 115, 117 which are arranged in four stages, to be parallel to the extending direction of the connecting portion 80 in order to change the route length of the connecting portion 80 for connecting the two adjacent antennas 32, 34. For this reason, two routes 112 and 114 are made to be extended by branching off from the central part of the connecting portion 80 in a direction orthogonal to the extending direction of the connecting portion 80.

For example, when only the switch 111 is turned on via a control device (such as the control device 200), the current flow passing through the connecting portion 80 travels straight without branching into the two routes 112, 114.

Similarly, when only the switch 113 is turned on, the current flow passing through the connecting portion 80 branches into the two routes 112, 114 by flowing through the switch 113, thereby increasing the route length and the route time.

Similarly, when only the switch 115 is turned on, the current flow passing through the connecting portion 80 branches into the two routes 112, 114 by flowing through the switch 115, thereby further increasing the route length and the route time.

Similarly, when only the switch 117 is turned on, the current flow passing through the connecting portion 80 branches into the two routes 112, 114 by flowing through the switch 117, thereby further increasing the route length and the route time.

In this way, by selectively turning on any one of the four switches 111, 113, 115, 117, the route length and the route time of the current flow through the connecting portion 80 are increased step by step.

As a result, when the two antennas 32, 34 are supplied with power along the route of the connecting portion 80, the phase of the electromagnetic waves radiated from the two antennas 32, 34 may be adjusted over time. That is, the phase difference between the electromagnetic waves radiated from the two patch antennas becomes bigger as the route length becomes longer.

Figure 26:
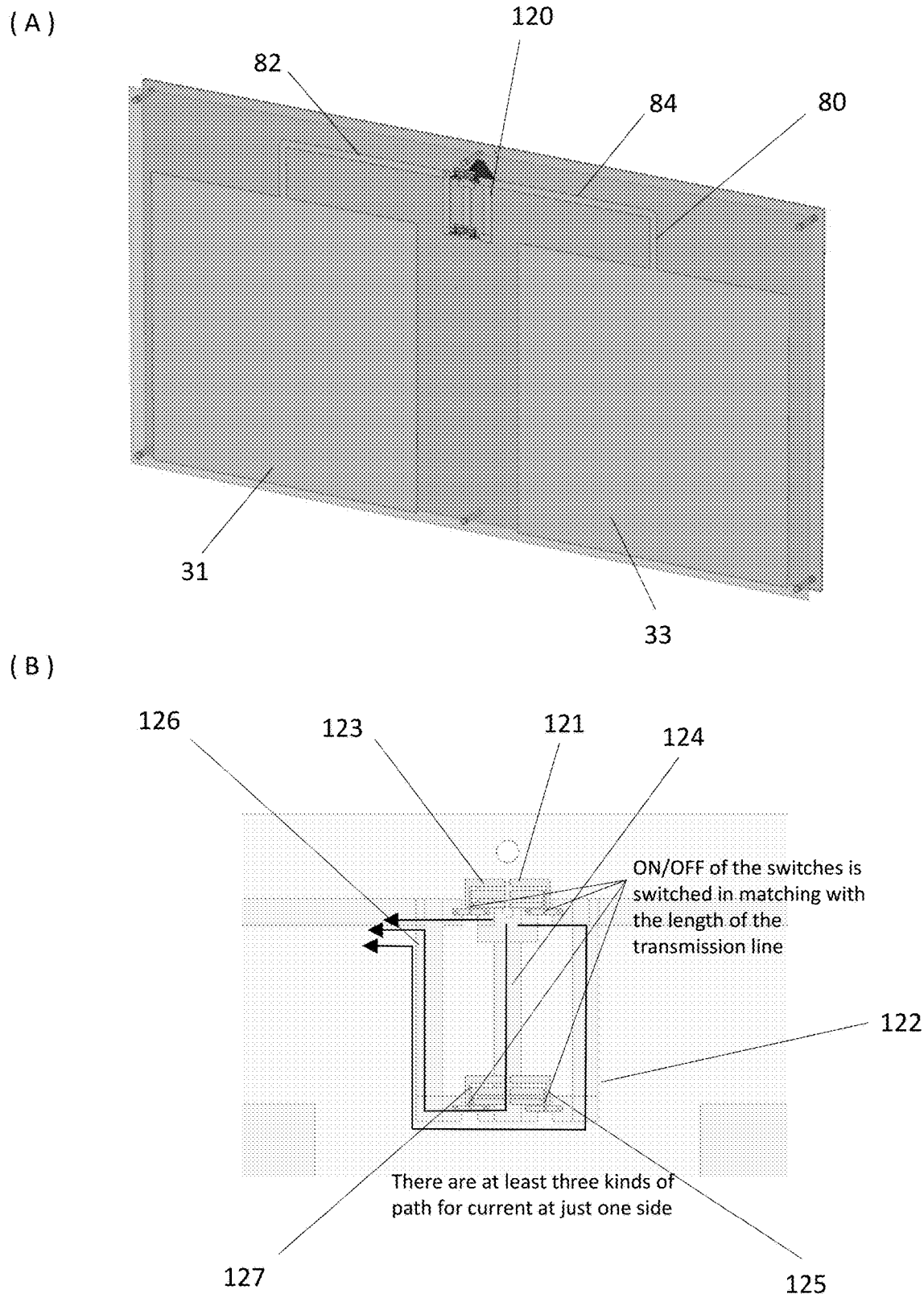
FIG. 26 illustrates an example in which the connection route of the two antennas illustrated in FIG. 22 is made to be selectable in stages by using switches and a branch portion, in (A) and (B) (Example 3).

FIG. 26 (A), (B) depicts an example showing a modified example 120 of the adjusting means (branching portion 110) of the route length of the connection portion 80 including the switches 111, 113, 115, 117 arranged with four stages illustrated in FIG. 25 (A), (B).

With referring to FIG. 26 (A), (B), the branch portion 120 is formed to include three routes 122, 124, 126 which are made to extend by branching into a direction orthogonal to the extending direction of the connecting portion 80 at the central part of the connecting portion 80, and four switches 121, 123, 125, 127 arranged between two of the three branching routes 122, 124, 126.

For example, when only the switches 121, 123 are turned on via the control device (such as the control device 200), the current flow passing through the connecting portion 80 travels straight without branching into the three routes 122, 124, 126.

Similarly, when only the switches 121, 127 are turned on, the current flow passing through the connecting portion 80 branches into the two routes 124, 126, increasing the route length and route time.

Similarly, when only the switches 125, 127 are turned on, the current flow passing through the connecting portion 80 branches into the two paths 122, 126, further increasing the route length and route time.

In this way, by selectively turning on the four switches 121, 123, 125, 127, the route length and the route time of the current flowing through the connecting portion 80 are increased step by step.

As a result, when power is supplied to the two antennas 32, 34 along the route of the connecting portion 80, the phase difference of the electromagnetic waves radiated from the two antennas 32, 34 may be adjusted step by step according to the change in the route length.

By superimposing the electromagnetic waves having the phase difference radiated from the two patch antennas 32, 34, it is possible to shift the radiation patterns to the left or the right.

Figure 27:
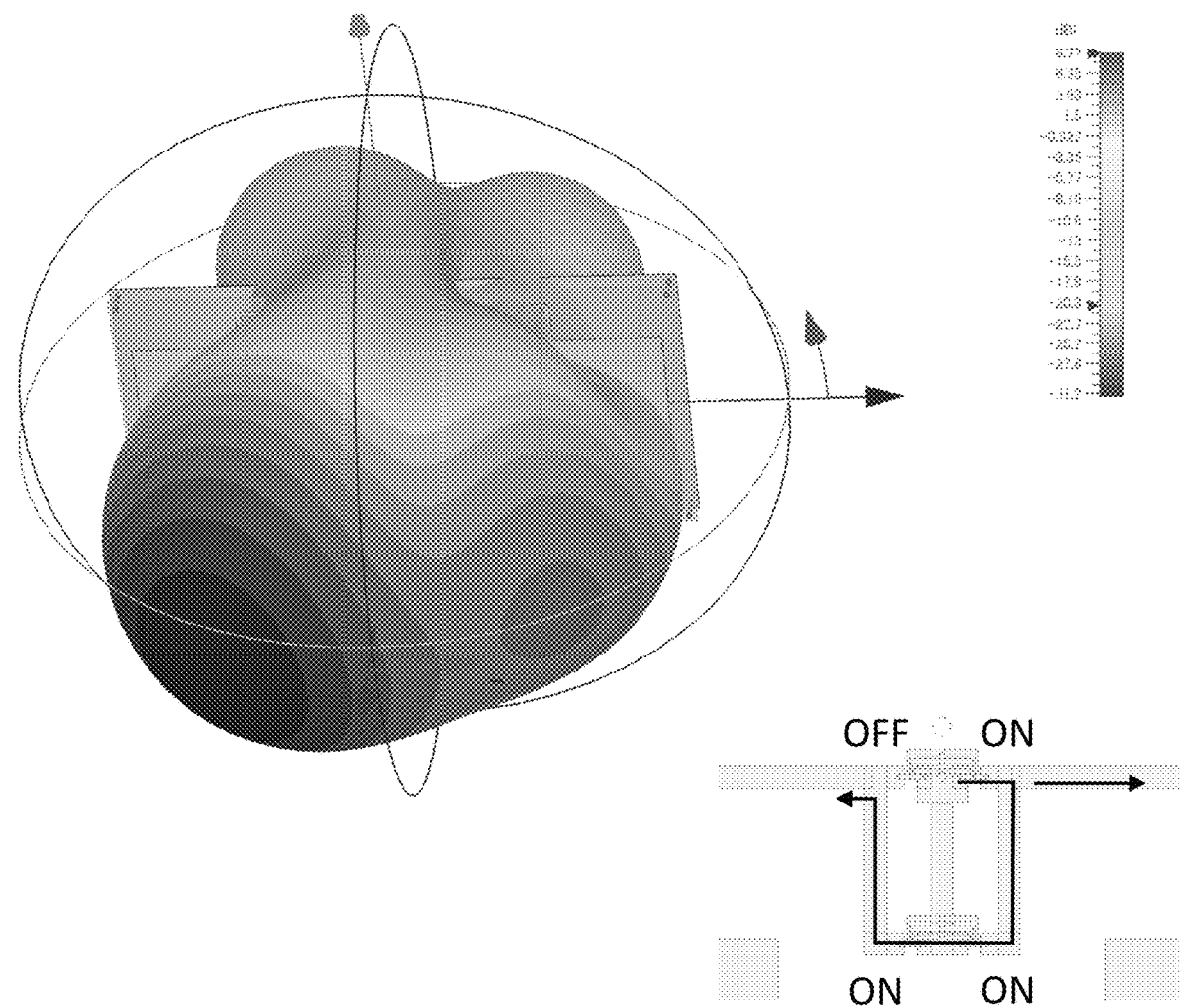
FIG. 27 illustrates an example of the radiation pattern of the wireless power-supply device illustrated in FIG. 26 (third embodiment).

FIG. 27 depicts an example showing the radiation pattern in the three-dimensional space for the case illustrated in FIG. 26. This example is configured to have the longest route length by adjusting the current flowing through the connecting portion 80 by turning on the switches 125, 127.

With referring to FIG. 27, it is illustrated that different radiation patterns may be realized on the left and the right when electric power is supplied to the two antennas 32, 34.

Figure 28:
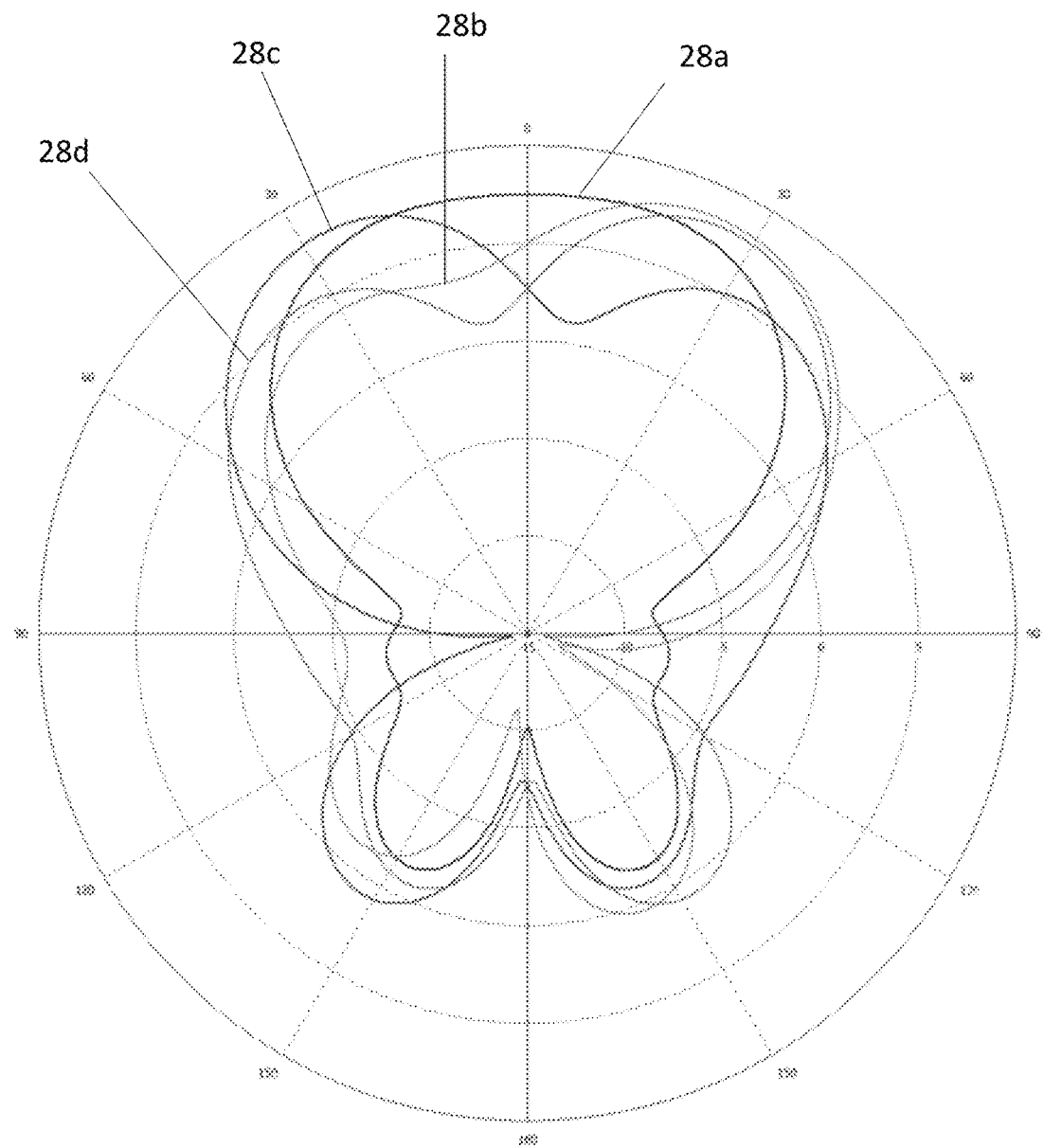
FIG. 28 illustrates an example of the radiation pattern of the wireless power-supply device illustrated in FIG. 26 (third embodiment).

With referring to FIG. 28, it is exemplified that different radiation patterns may be made for the case illustrated in FIG. 26.

For example, in the case denoted by the reference numeral 28a, it can be seen that the electromagnetic waves radiated from the antennae are radiated straight and symmetrically in the left-right directions around a direction of 0 degree, by switching the switches provided in the connecting portion 80.

On the other hand, in the cases denoted by reference numerals 28b to 28d, it can be seen that the electromagnetic waves radiated from the antennae are biased leftward or rightward relative to the direction of 0 degree when being radiated, by switching the switches provided in the connecting portion 80.

As described above, with referring to FIGS. 25 to 28, it can be seen that it is possible to perform the control of the phase difference flowing through the two antennas via an arbitrary control device (for example, the control device 200), by providing the branch portion 110 or 120 consisting of a plurality of switches, with regard to the connecting portion 80 for directly connecting the two antennas.

Incidentally, it is also possible to perform the control of the phase difference flowing through the two antennas via an arbitrary control device (for example, the control device 200), by providing a branch portion 110 or 120 consisting of a plurality of switches, with regard to the connecting portion 90 for connecting the two antennas in a zigzag pattern as illustrated in FIGS. 23, 24.

Furthermore, the control performed by the branch portion 110 or 120 including a plurality of switches may be combined with the control of the meta-surface 10 including a plurality of patches exemplified in the first and second embodiments.

Figure 29:
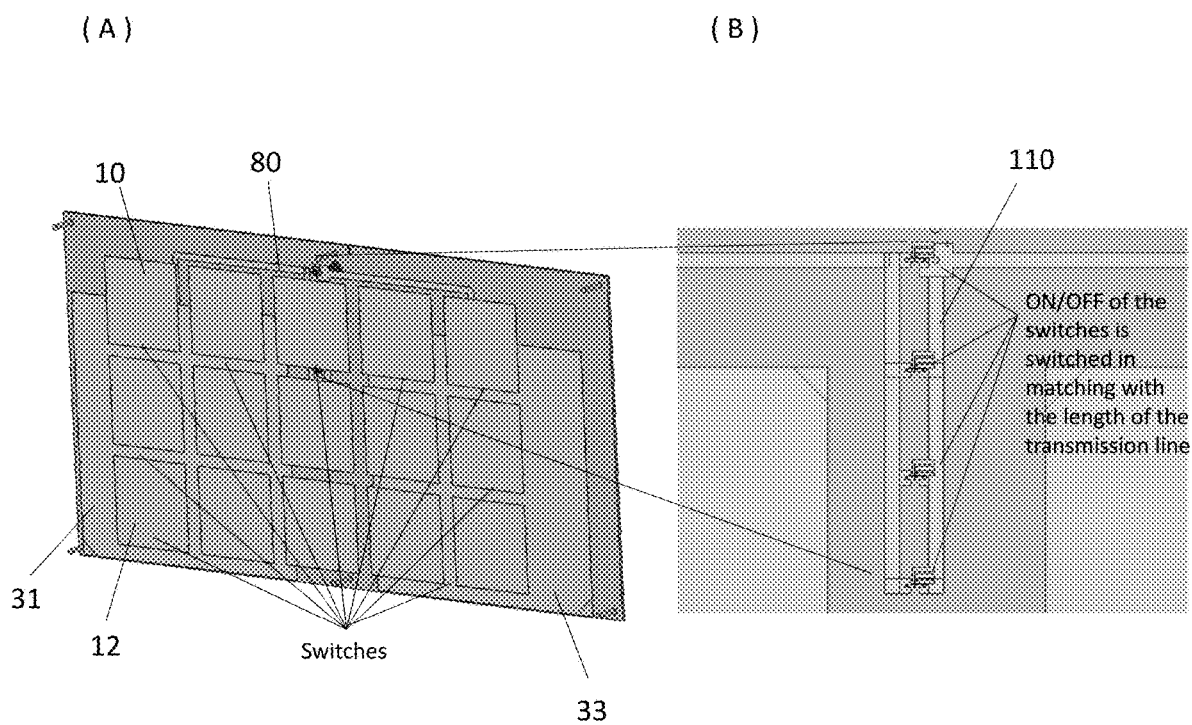
FIG. 29 illustrates an example in which a meta-surface having an array of 3×6 is combined to the wireless power-supply device illustrated in FIG. 2, in (A) and (B) (Example 3).

With referring to FIG. 29 (A), (B), it is illustrated that a meta-surface 10 having a total of fifteen pieces of patches 12 in the array of 3 rows x 5 columns is provided with switches for controlling the energization condition of the respective patches. It is possible to variously change the energization condition of the plurality of patches 12 constituting the meta-surface 10 by controlling the above-mentioned switches.

Accordingly, it becomes possible to change the radiation direction of the electromagnetic waves transmitted through the meta-surface 10.

Further, with referring to FIG. 29 (A), (B), the two antennas 31, 33 arranged on the back surface side of the meta-surface 10 which is configured to have a total of fifteen pieces of the patches 12 in the array of 3 rows x 5 columns are connected with the connecting portion 80 and include the branch portion 110 consisting of a plurality of switches. It is possible to variously change the phase difference flowing through the two antennas 31, 33 via the connecting portion 80 by controlling the above-mentioned switches.

Accordingly, it is possible to change the radiation direction of the electromagnetic waves radiated from the patch antennas 31, 33.

Furthermore, these two types of control may be combined for use in order to perform more complicated control of the radiation pattern of the electromagnetic waves radiated from the antenna through the meta-surface 10.

So far, the beamforming of the electromagnetic waves radiated from the antenna is enabled in each case of the first embodiment described with referring to FIGS. 1 to 11, the second embodiment described with referring to FIGS. 12 to 19, and the third embodiment described with referring to FIGS. 20 to 29.

Each of the first embodiment, the second embodiment, and the third embodiment may be independently implemented. Also, the first embodiment, the second embodiment, and the third embodiment may be used in combination with each other. Therefore, the wireless power-supply devices 1, 2 may be configured to be capable of supplying power to various devices such as a sensor or an actuator in the fields of FA, IoT, home appliances, and the like.

Example 4

Subsequently, with referring to FIGS. 30 to 35, an example in which the beamforming using the above-mentioned wireless power-supply device 1, 2 is conducted in the field of actual FA will be described.

Figure 30:
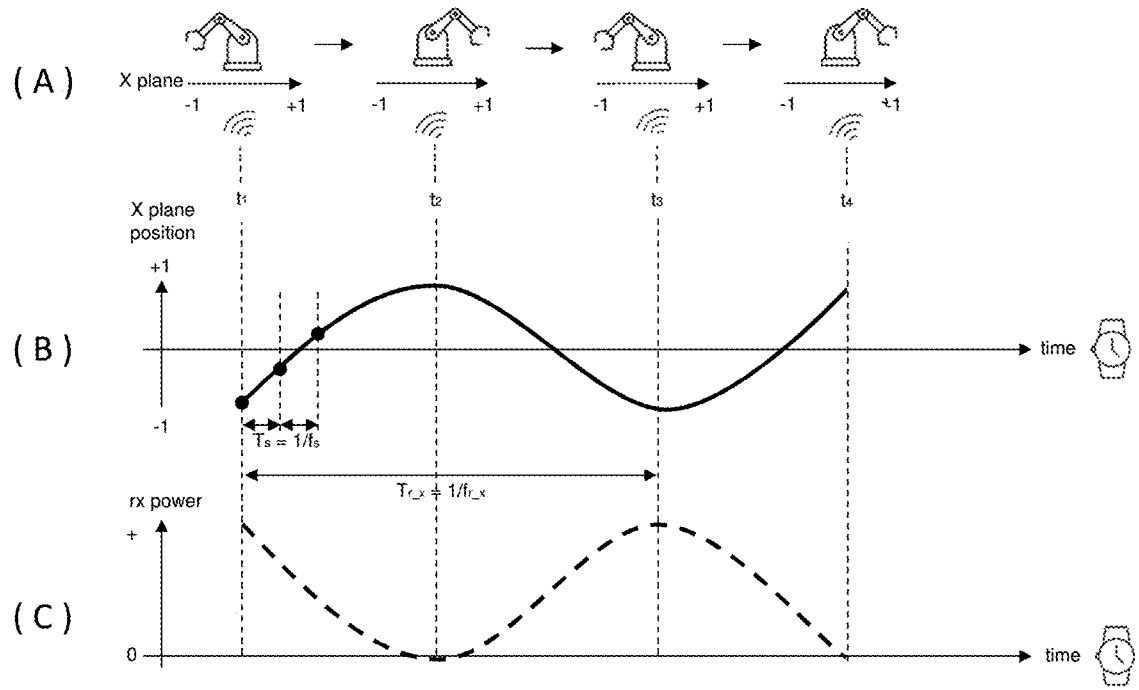
FIG. 30 illustrates an example of a state of antenna direction with respect to an operated robot hand, a graph of position of the robot hand that is periodically changed, and a state of electric power received by a receiving terminal installed in the robot hand, in (A), (B) and (C) (Example 4).

With referring to FIGS. 30 to 34, an example in which the wireless power supply is performed from a power transmitting device to a power receiving device is schematically illustrated for a case where the power receiving device is attached to a distal end portion (or distal end portion of an arm) of a robot hand FIG. 30 (A) depicts an example in which a main body of a robot hand is installed on a substrate, and its movable part is frequently operated in the three-dimensional space on the left side and the right side.

In this example, at the time t1, it is illustrated that the distal end portion of the robot hand faces the left side and accordingly, the antenna of the power transmitting device is set to the left side in order to wirelessly supply power toward the power receiving device such as a sensor disposed at the distal end portion.

At the time t1, the direction of the antenna of the power transmitting device corresponds to the position of the power receiving device so that the electromagnetic waves transmitted from the power transmitting device may be received by the power receiving device in a comparatively good condition.

With referring to FIG. 30 (A), it is illustrated that the robot hand is frequently operated as time progresses such as t1, t2, t3, and t4. In this case, if the direction of the antenna of the power transmitting device is fixed, for example, at the time t2, t4, the distal end portion of the robot hand faces rightward and does not correspond to the power transmitting direction of the antenna which is set to the leftward direction. In such a case, the electromagnetic waves transmitted from the power transmitting device in the free space may be hardly received by the power receiving device satisfactory.

With referring to FIG. 30 (B), it is illustrated that the distal end portion of the robot hand is periodically moved to the left side and the right side as time progresses such as t1, t2, t3, and t4.

With referring to FIG. 30 (C), it is illustrated that electric power received by the power receiving device which is provided at the distal end portion of the robot hand is greatly fluctuated as time progresses such as t1, t2, t3, and t4. In particular, at the time t2, t4, it can be seen that the positions of the electromagnetic waves transmitted from the power transmitting device are different from the positions of the distal end portion of the robot hand to which the power receiving device is attached so that electric power is not received by the power receiving device.

Figure 31:
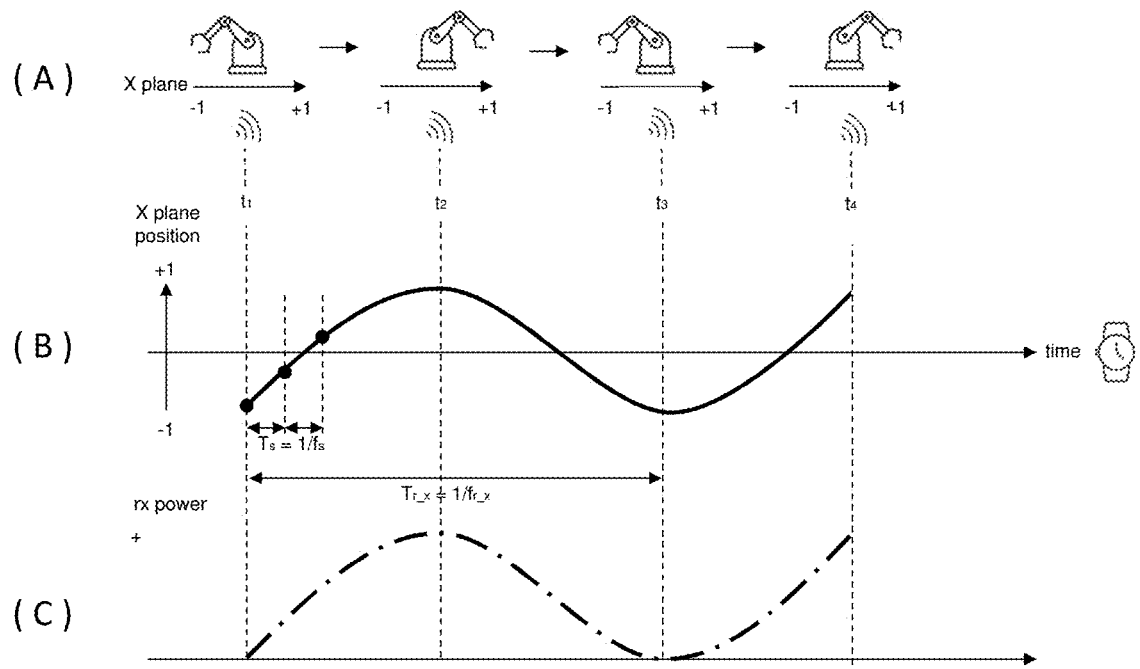
FIG. 31 illustrates an example of a state of antenna direction with respect to an operated robot hand, a graph of position of the robot hand that is periodically changed, and a state of electric power received by a receiving terminal installed in the robot hand, in (A), (B) and (C) (Example 4).

With referring to FIG. 31 (A) to (C), a case similar to that of FIG. 30 (A) to (C) is exemplified.

The example of FIG. 31 (A) to (C) differs only in the direction of the antenna of the power transmitting device which is fixed to the right.

In this case as well, it can be seen that the distal end portion of the robot hand is frequently changed so that that electric power received by the power receiving device which is provided at the distal end portion of the robot hand is greatly fluctuated. In particular, at the time t1, t3, it is illustrated that the electromagnetic waves transmitted from the power transmitting device are not received by the power receiving device.

Figure 32:
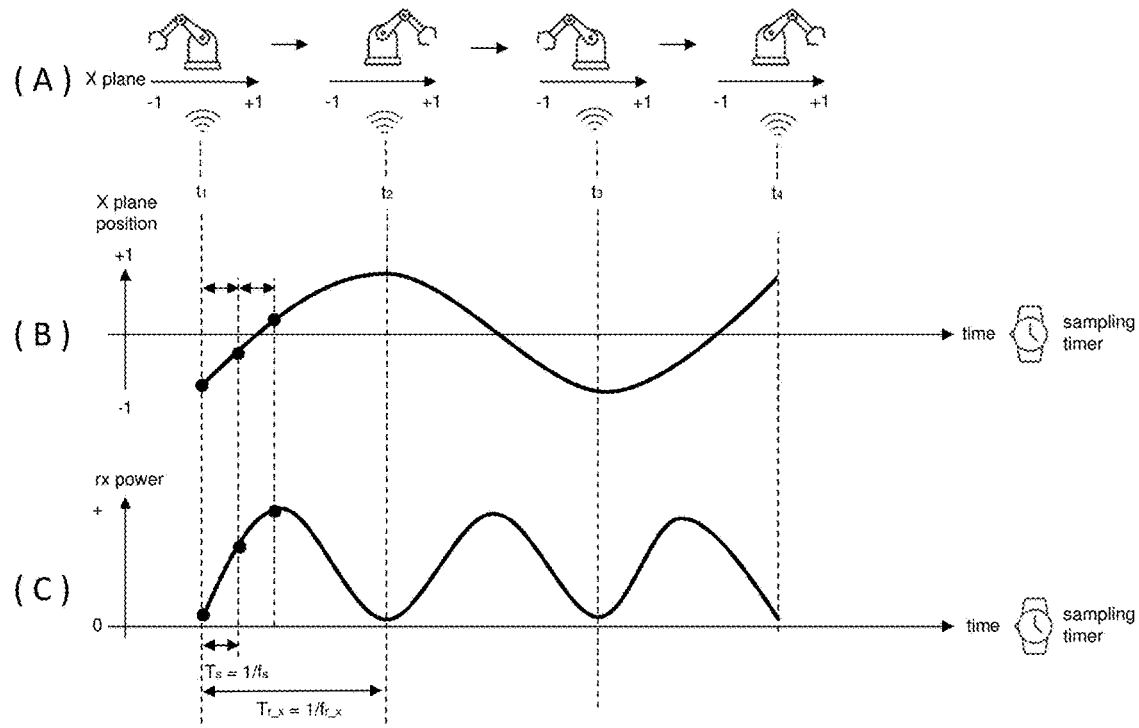
FIG. 32 illustrates an example of a state of antenna direction with respect to an operated robot hand, a graph of position of the robot hand that is periodically changed, and a state of electric power received by a receiving terminal installed in the robot hand, in (A), (B) and (C) (Example 4).

With referring to FIG. 32 (A) to (C), a case similar to that of FIG. 30 (A) to (C) is exemplified.

The example of FIG. 32 (A) to (C) differs only in the direction of the antenna of the power transmitting device which is fixed to the front.

In this case as well, it can be seen that the distal end portion of the robot hand is frequently changed so that that electric power received by the power receiving device which is provided at the distal end portion of the robot hand is greatly fluctuated.

Figure 33:
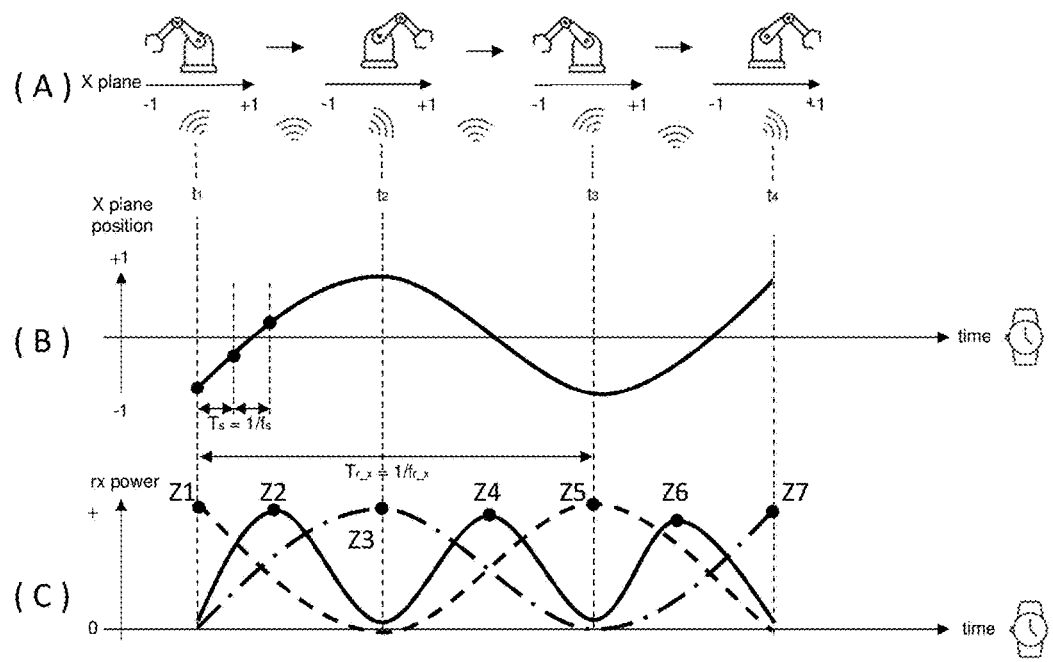
FIG. 33 illustrates an example of a state of antenna direction with respect to an operated robot hand, a graph of position of the robot hand that is periodically changed, and a state of electric power received by a receiving terminal installed in the robot hand, in (A), (B) and (C) (Example 4).

FIG. 33 (A) to (C) depicts an example in which the beamforming of the electromagnetic waves radiated from the antenna may be performed using the wireless power-supply device 1, 2 according to the first embodiment, the second embodiment, or the third embodiment.

As can be seen from FIG. 33 (A), in a case where the distal end portion of the robot hand is frequently changed, the power transmitting direction of the antenna of the power transmitting device is adjusted in accordance with the change of the distal end portion (in other words, the beamforming is performed).

Therefore, as can be seen from FIG. 33 (B), even if the distal end portion of the robot hand is periodically moved to the left side and the right side as time progresses such as t1, t2, t3, and t4. as can be seen from FIG. 33 (C), the power transmitting device is capable of continuously transmitting electromagnetic waves in an optimum direction to be received by the power receiving device, as denoted by reference numerals Z1, Z2, Z3, ZA, Z5, Z6, and Z7.

With referring to FIG. 33 (A) to (C), it can be seen that it is possible to utilize a "learning (or training)" model and a "reasoning (or estimating)" model in a case where the beamforming of the electromagnetic waves radiated from the antenna is performed using the wireless power-supply device 1, 2 according to the first embodiment, the second embodiment, or the third embodiment.

Figure 34:
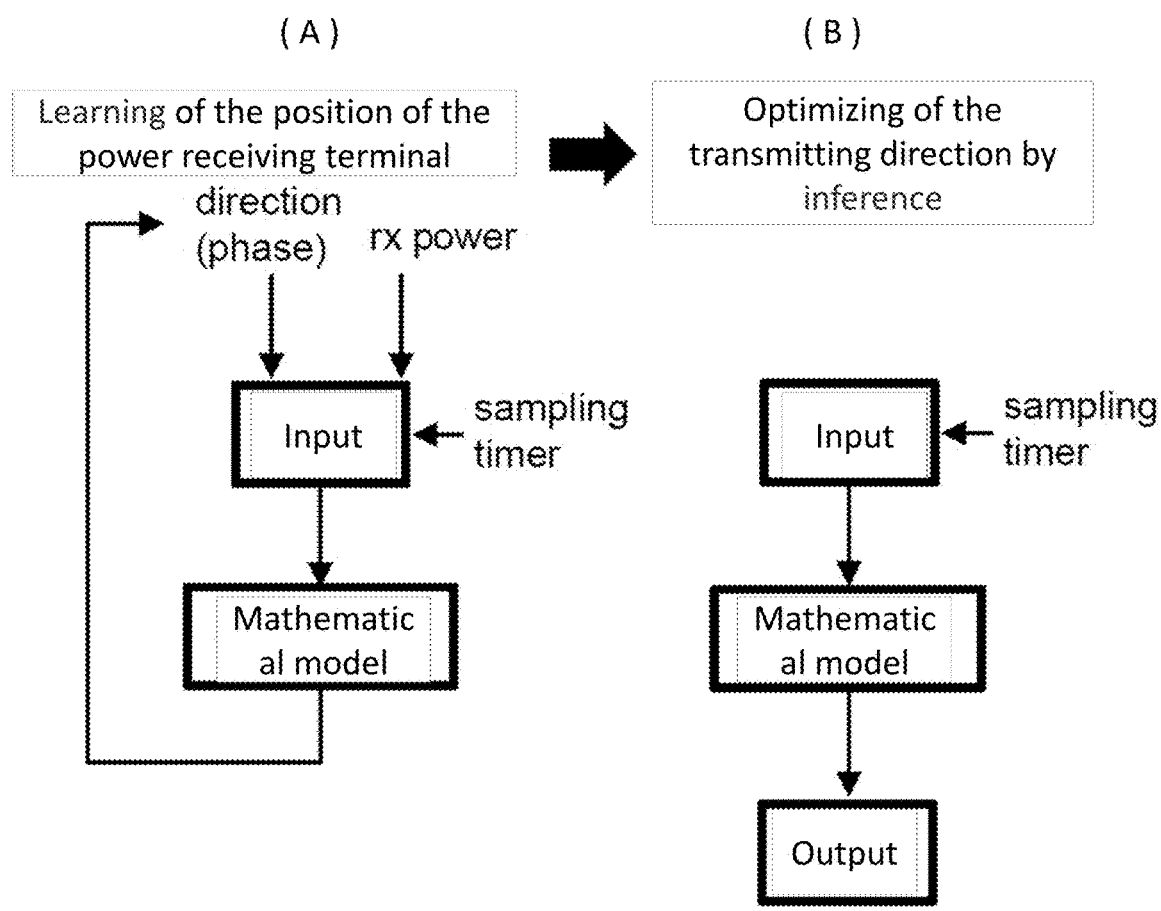
FIG. 34 illustrates an example of learning and reasoning processes with respect to the position of the receiving terminal, in (A) and (B) (Example 3).

FIG. 34 (A) depicts an example of a learning process with respect to the position of the power receiving terminal disposed at the distal end portion of the robot hand which is frequently operated.

The distal end portion of the robot hand changes its position variously, but usually does not change it randomly. Therefore, it is possible to learn the change in the position of the distal end portion of the robot hand by using some kind of a calculation means (or control device or the like).

For example, as illustrated in FIG. 34 (A), it is possible to input information on the transmitting direction of the antenna of the power transmitting device at certain times and electric power received by the power receiving terminal which is disposed at the distal end portion of the robot hand. By continuously tracking both values, it becomes possible to construct a mathematical model with respect to the power receiving condition.

For example, in a case where the transmitting direction of the antenna is aligned with the position of the distal end portion of the robot hand, electric power received by the power receiving terminal may indicate an excellent value. On the other hand, in a case where the transmitting direction of the antenna is not aligned with the position of the distal end portion of the robot hand, electric power received by the power receiving terminal may indicate a low value. By exhaustively investigating and accumulating these values, it becomes possible to construct a mathematical model for finding an excellent power receiving effect from the point of view of the time (or sampling timer) and the direction of the antenna.

For example, it is possible to construct a mathematical model such as "$F(t, d)=V$" by using the time (t: sampling time) obtained from a sampling timer, the transmitting direction (d: direction) of the antenna at that time, and the electric power (V) received by the power receiving device at that time. In this case, "F" denotes an arbitrary function which may be obtained by a computer simulation using an appropriate algorithm. In this case, for example, the Euler method, the finite element method, the Monte Carlo method, or the like may be used for that purpose.

Subsequently, FIG. 34 (B) depicts an example of the reasoning process with respect to the position of the power receiving terminal which is disposed at the distal end portion of the robot hand that is frequently operated.

As illustrated in FIG. 34 (A), after the mathematical model is obtained, information at a certain time (sampling timer) is inputted into the mathematical model (for example, $F(t, d)=V$). Consequently, it becomes possible to acquire an optimum transmitting direction for achieving an excellent power receiving effect. Therefore, by performing the beamforming of the electromagnetic waves radiated from the antenna, based on this output, using the wireless power-supply device 1, 2 according to the first embodiment, the second embodiment, or the third embodiment, it becomes possible to continuously transmit power energy in an optimum direction.

Incidentally, during the course of the above-mentioned learning and reasoning processes, it is possible to automatically adjust the "certain time (sampling timer)" used for the optimization. A system is constructed with a mathematical model which is automatically modified regardless of the start time, and accordingly, there is no need to specify the start time of the "certain time".

Also, there is no need to obtain information of the "direction" from the actual system in a factory, and it may be uniquely determined by the power transmitting device. The present example is provided for evaluating the effectiveness with respect to the uniquely determined "direction" and for constructing the mathematical model. It can be expected that, ultimately, an optimal result may be obtained as well in any method.

Therefore, the present embodiment is suitable for using a correction in which a certain motion is repeated, which is particularly remarkable in the case of the FA.

Therefore, the present embodiment constitutes a method of transmitting energy to a power receiving terminal that varies its position in the three-dimensional space by using a wireless power-supply device and a control device.

The control device includes the below-mentioned steps of:
- tracking a time, a transmitting direction of electromagnetic waves E1 to E3 (see FIG. 1) of a wireless power-supply device 1 (see FIG. 1), and electric power received by a power receiving device, in response to a change in a position of the power receiving device;
- calculating a transmitting direction of electromagnetic waves E1 to E3 of the wireless power-supply device 1 based on the tracking; and
- controlling the transmitting direction of electromagnetic waves E1 to E3 of the wireless power-supply device 1 based on the calculation result.

The control device 200 may be, for example, a single-board computer equipped with a processor. For example, a Raspberry Pi® or the like may be used as the control device 200. It may also be implemented by an edge-computing, such as a Python® or the like provided on a Raspberry Pi.

The control device is not limited to the above-mentioned examples, and may be, for example, a portable terminal such as a smart phone, a tablet, a mobile phone, or a personal digital assistant (PDA); a wearable terminal such as a glasses-type wearable terminal, a wristwatch-type wearable terminal, or a clothing-type wearable terminal; a computer such as a stationary computer, a portable notebook-type personal computer, or a server disposed on a cloud or a network; or a combination of the plurality of terminals. For example, a combination of one smartphone and one wearable terminal may logically function as one terminal. It is also possible to use any one of other information processing terminals.

The main storage device may be associated with the control device. Various programs, applications, and the like (or modules) may be stored in the main storage device, and each functional element of the entire system is realized when the processor executes any one of the programs and applications. Incidentally, each module may be implemented by hardware, for example, by integrating it. Each module may be an independent program or an application. Alternatively, each module may be implemented as a form of a subprogram or a function that is a part of a single integrated program or an application.

So far, the wireless power-supply device according to the first to fourth embodiments and the method of transmitting electric power to a power receiving terminal using the above-mentioned wireless power-supply device have been described with referring to the figures.

By using any one of the first to fourth embodiments alone or by using any two or the plurality of first to fourth embodiments in combination, it is possible to configure a wireless power-supply device suitable for automatically learning an optimal method (XYZ plane orientation and frequency) without a teacher and performing the beamforming, and also a method of transmitting electric power to a power receiving terminal by using the above-mentioned wireless power-supply device.

In particular, it is possible to increase the efficiency in receiving power by using any one of the first to fourth embodiments alone or by using any two or the plurality of first to fourth embodiments in combination. In this case, it is also possible to suppress the dependence on the environment. In addition, it is possible to automatically avoid the occurrence of a standing wave (or stationary wave) even in a case where a plurality of power transmitting devices are simultaneously used in the same space.

Incidentally, the present embodiments are not limited to the examples illustrated in the figures.

For example, although in the above descriptions it is explained that a preferable example of the wireless power-supply device is configured to use patch antennas (or planar antennas) in combination with a meta-surface. However, the present embodiments are not limited to that type. It is possible to use a linear antenna in the wireless power-supply device in combination with the meta-surface, with patch antennas (or planar antennas). It is also possible to use a linear antenna in the wireless power-supply device in combination with the meta-surface instead of one or a plurality of patch antennas. As the linear antenna, for example, it is possible to use one or a plurality of linear antennas such as a dipole antenna, a monopole antenna, and an inverted-F antenna, etc.

Incidentally, it is also possible to add an arbitrary device or the like for improving current flow in the antenna according to the present embodiments. Furthermore, although the antennas according to the present embodiments have been described to be used on the power transmitting side, it is also possible to adapt one or a plurality of antennas on the power receiving side.

As described above, the applicants performed simulations using mathematical models on a computer, with respect to the power transmitting devices.

In addition, the applicants actually conducted measurement experiments in which electric power is wirelessly supplied from a power transmitting device to a power receiving device.

From the measurement experiments, the effectiveness of the power transmitting device according to the present invention was confirmed. The detailed explanation is given below.

Figure 35:
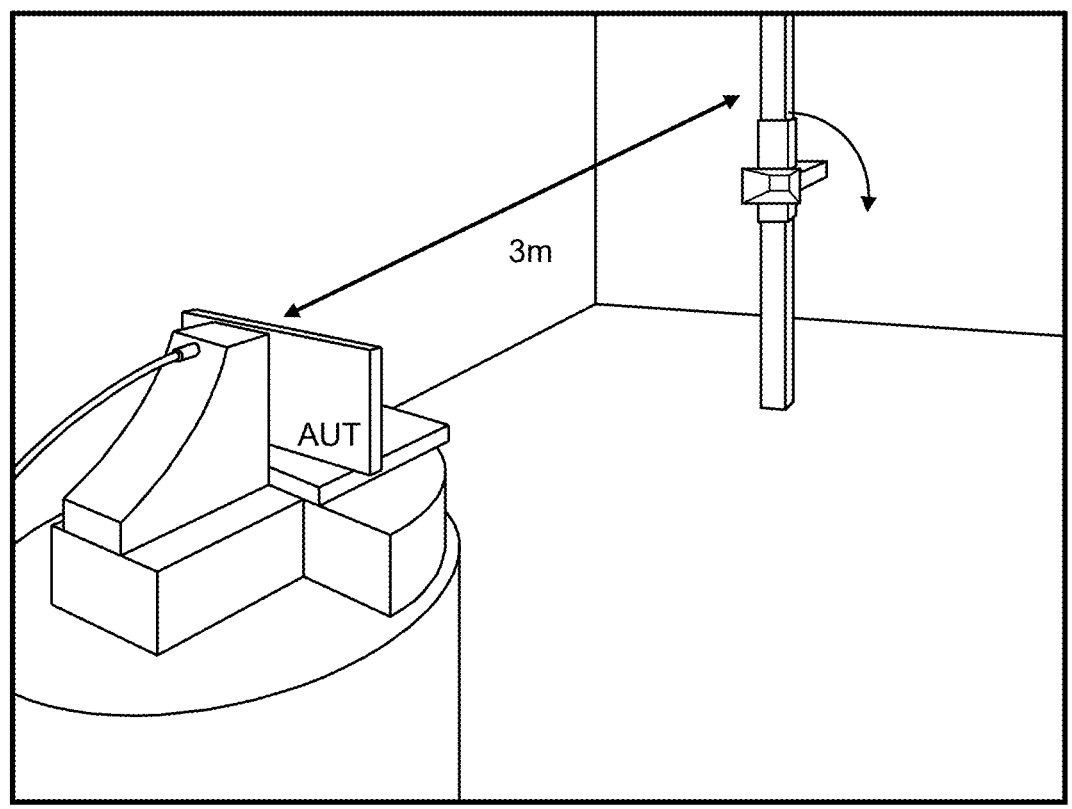
FIG. 35 illustrates an example of an environment at the time of performing measurement experiments when power is wirelessly supplied from a power transmitting device to a power receiving device, in (A) and (B).

With referring to FIG. 35, the environment used to perform the above-mentioned measurement experiments is illustrated.

As can be seen from the figure, an anechoic chamber (or radio wave dark room) was used for six planes in the three-dimensional space when conducting the above-mentioned measurement experiments. Therefore, it was devised to carry out the measurement experiments of wireless power transmission with high reliability and efficiency in order not to be affected by the influence of electromagnetic waves or electromagnetic noises caused from the outside as much as possible.

When a power transmitting device and a power receiving device according to the present invention are provided in the anechoic chamber, these devices are arranged so as to have a distance of 3m for receiving/transmitting power therebetween. In addition, these devices were each arranged at a predetermined height. Furthermore, the relative direction between the power transmitting device and the power receiving device was made to be changeable in order to obtain the experimental results for the changes in the direction. Therefore, it was devised to carry out the measurement experiments under an ideal environment by approaching the experiments to the actual condition as close as possible when performing the wireless power transmission.

Subsequently, various measurement experiments were performed assuming that general radio waves were transmitted in the environment illustrated in FIG. 35. Specifically, a standard-signal generator (SSG or SG) was used at the transmitting side, and a spectrum analyzer was used at the receiving side.

Furthermore, supposing that general wireless transmission and reception were carried out, EIRP (Effective Isotropic Radiated Power) was measured according to the level of the obtained output for the EIRP at a reference dipole. Here, the EIRP refers to the strength of electric power of radio waves radiated in a certain direction.

A horn antenna capable of switching the horizontal and vertical polarization waves (HV plane) was used as a receiving antenna.

Figure 36:
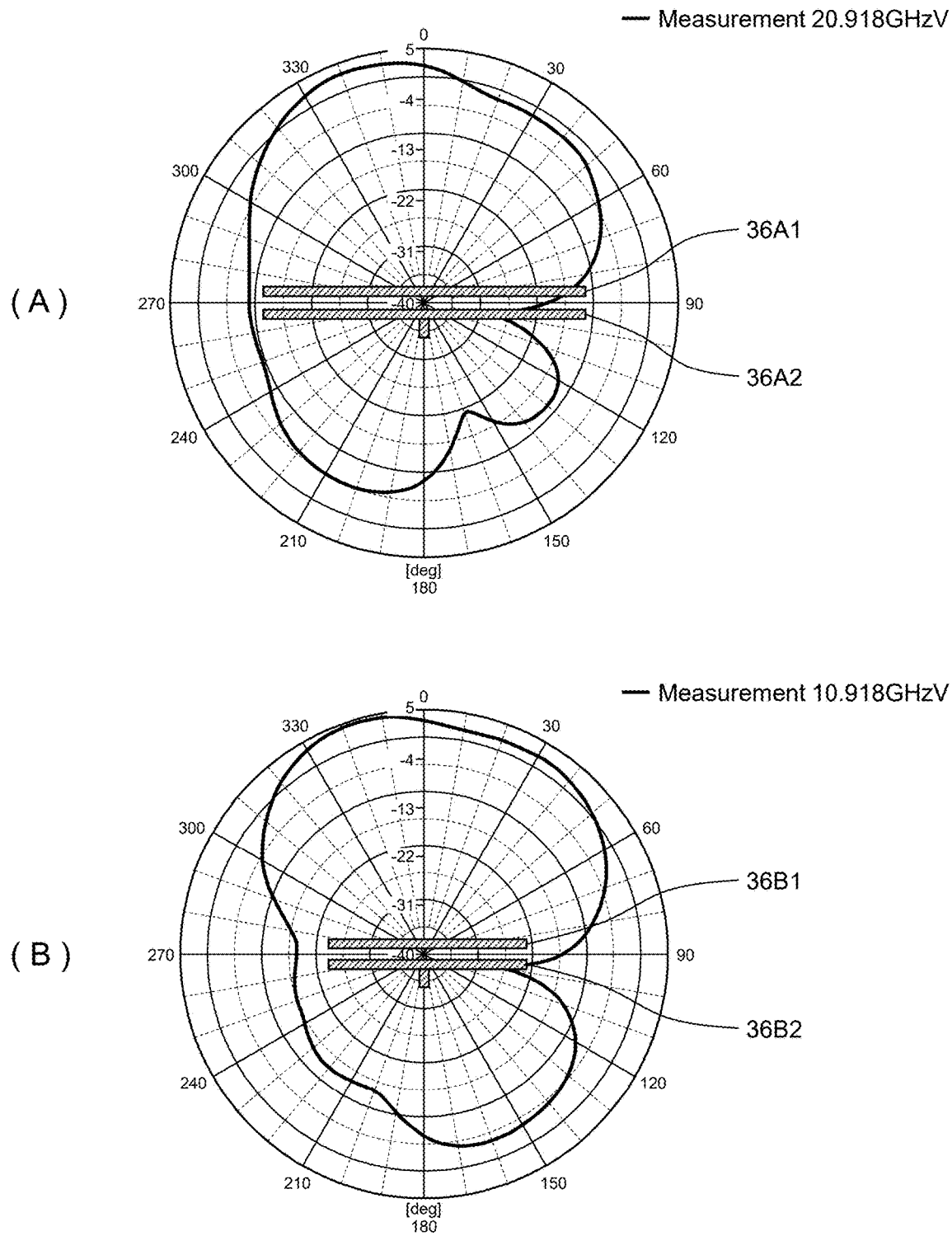
FIG. 36 illustrates an example of measurement results obtained under the measurement environment illustrated in FIG. 35, in (A) and (B).

With referring to FIG. 36 (A), (B), the measurement results under the measurement environment illustrated in FIG. 35 are illustrated. The measurement results correspond to the EIRP measurement results of the two patch antennas illustrated in FIG. 23 (C). In this case, each patch has a substantially rectangular shape having a small thickness.

The reference numeral 36A1 denotes the emitting surface and the reference numeral 36A2 denotes the ground. In FIG. 23 (C), a thin plate-shaped antenna is provided, and in FIG. 36 (A), the longitudinal direction (the longer side) of that antenna of FIG. 23 (C) is arranged so as to be aligned in the left-right direction of the paper surface. FIG. 36 (B) illustrates a case in which the antenna of (A) is rotated by 90 degrees and the lateral direction (the shorter side) of that antenna of FIG. 23 (C) is arranged so as to be aligned in the left-right direction of the paper surface.

As described in the part of FIG. 23 (C), the two patch antennas are rotated 90 degrees in FIG. 23 (C), one of which is configured to radiate horizontal polarization waves and the other of which is configured to radiate vertical polarization waves. That is, the two-patch antennas are capable of radiating both horizontal and vertical polarization waves.

With referring to FIG. 36 (A) (B), the radiation patterns which are measured for the two patch antennas are illustrated in a condition where the two patch antennas are turned by 90 degrees. It is confirmed that it is possible to achieve the beam output in either case.

It is acknowledged that, with regard to the EIRP, the vertical plane had a value of 3.394 dB and the horizontal plane had a value of 4.27 dB (for the input of 1W).

Figure 37:
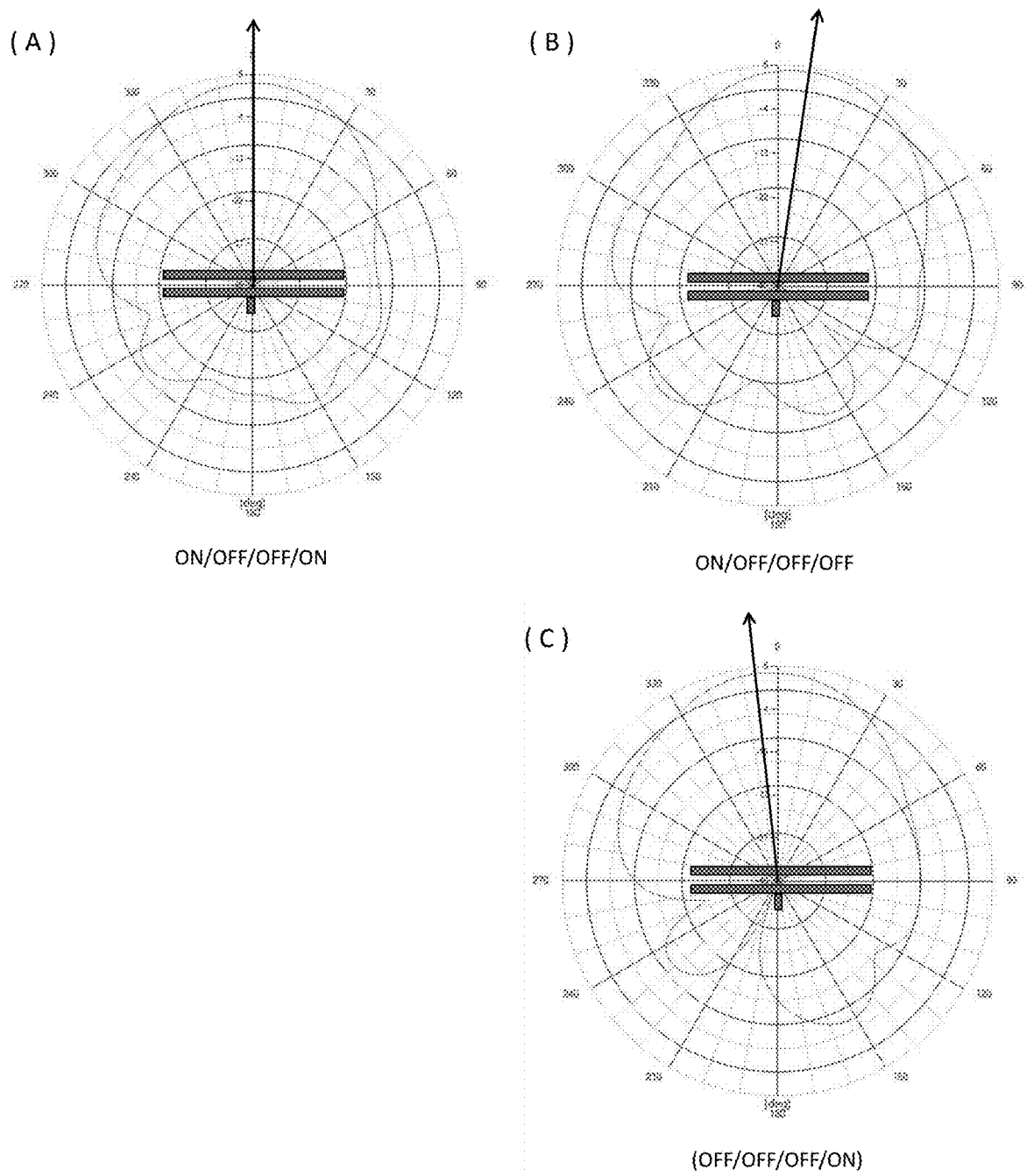
FIG. 37 illustrates an example of measurement results obtained under the measurement environment illustrated in FIG. 35, in (A), (B) and (C).

With referring to FIG. 37 (A), (B), (C), other measurement results obtained under the measurement environment illustrated in FIG. 35 are illustrated.

FIG. 37 corresponds to the measurement results for the EIRP at the switch antenna illustrated in FIG. 26 (A) in a condition where the radiation patterns are measured by turning on or off the respective switches (123/127/125/121) of FIG. 26 (B).

With referring to FIG. 37 (A), it is confirmed that, for a case where the combination of the four switches of the two-patch antennas is (ON/OFF/OFF/ON), for the EIRP, the horizontal plane had a value of 3.218 dB when the reference at the center had a value of 0 degree.

With referring to FIG. 37 (B), it is confirmed that, for a case where the combination of the four switches of the two-patch antennas is (ON/OFF/OFF/OFF), the EIRP has the value of 4.073 dB by being shifted to the right side from the reference by 9 degrees, With referring to FIG. 37 (C), it is confirmed that, for a case where the combination of the four switches of the two-patch antennas is (OFF/OFF/OFF/ON), the EIRP has the value of 3.675 dB by being shifted to the left side from the reference by 7 degrees, In the case of FIG. 37 (A), it is confirmed that the direction of the main lobe (or lobe in the strongest radiation direction) is directed along the direction of 0 degree at the reference, but by appropriately switching the four switches, it is possible to shift the direction of the main lobe to the right side (see FIG. 37 (B)) or to the left side (see FIG. 37 (C)). In each case, it is confirmed that the side lobes (or lobes excluding the main lobes) are also changed. In addition, it is confirmed that the direction of the main lobe may be switched at about 10 degrees in both the left and right directions. Therefore, in practice, it is expected that the direction of beamforming may be set relatively finely.

Therefore, it is confirmed that it is possible to perform the beamforming according to the present invention not only by the computer simulation but also by the actual measurements obtained from the above-mentioned measurement results.

The present invention is not limited to the above-described embodiments, but includes various modifications. For example, the above-mentioned embodiments have been described in detail to clearly illustrated the present invention, and are not necessarily limited to those having all the described configurations. In addition, it is possible to replace a part of the configuration of one embodiment with the configuration of another embodiment. Also, it is possible to add the configuration of one embodiment to the configuration of another embodiment. Further, with respect to a part of the configuration of each embodiment, it is possible to add, delete, or replace with the other configuration.

In addition, control lines and information lines considered to be necessary for explanation are illustrated. Not all control lines and information lines for implementation of the product are necessarily illustrated. In practice, almost all of the configurations may be considered to be interconnected with each other.

It should be noted that the above-described embodiments disclose at least the configurations described in the claims.

SIGN DESCRIPTION

1 . . . . Wireless power-supply device, 10 . . . meta-surface, 12a, 12b, 12c . . . patches (waveguide patches or radiation patches), 20a, 20b . . . switches (high-frequency switches or RF switches), 30 . . . antenna (patch antenna or planar antenna), 200 . . . control device (or controller)

What is claimed is:
1. A wireless power-supply device comprising:
a meta-surface including a plurality of waveguide patches and a plurality of switches arranged in association with the plurality of waveguide patches;
a control device for controlling a state of power supply to the plurality of switches; and
an antenna for emitting electromagnetic waves for transmitting power;
wherein the wireless power-supply device is configured to change a relation of connection of the plurality of waveguide patches by turning on or off the plurality of switches, so as to change a radiation pattern of electromagnetic waves radiated from the antenna.
2. The wireless power-supply device according to claim 1, wherein the wireless power-supply device is configured to adjust the radiation pattern by changing a state of energization for each part of the plurality of waveguide patches.

3. The wireless power-supply device according to claim 1, wherein the wireless power-supply device is configured to adjust the radiation pattern by changing a separation distance between the waveguide patches and the antenna.

4. The wireless power-supply device according to claim 1, wherein the switch is associated with the plurality of waveguide patches such that the switch bridges two waveguide patches adjacent to each other.

5. The wireless power-supply device according to any one of claim 1, wherein the plurality of waveguide patches form the meta-surface as a whole,
wherein one of the waveguide patches, disposed outside to be in contact with an outer periphery of the meta-surface, is assigned one of the switches at a side of the outer periphery of adjacent sides, and
wherein one of the waveguide patches, disposed inside not to be in contact with the outer periphery of the meta-surface, is assigned one of the switches at a center side of adjacent sides.

6. The wireless power-supply device according to claim 1, wherein the plurality of waveguide patches form the meta-surface as a whole,
Wherein one of the waveguide patches, disposed outside to be in contact with an outer periphery of the meta-surface, is assigned three of the switches, and
Wherein one of the waveguide patches, disposed inside not to be in contact with the outer periphery of the meta-surface, is assigned four of the switches.

7. The wireless power-supply device according to claim 1, wherein the plurality of waveguide patches are periodically arranged on a substrate in an array of m×n in which n indicates the number of waveguide patches in a length direction and m indicates the number of waveguide patches in a width direction, and
wherein a total number of the switches associated with the plurality of waveguide patches is determined from a following formula, $m*(n-1)+n*(m-1)$.

8. The wireless power-supply device according to claim 1, wherein the antenna is constituted of at least two antennas, and
wherein a connecting line for connecting the at least two antennas includes a plurality of switches and a plurality of branch portions that are capable of changing a route length of the connecting line.

9. The wireless power-supply device according to claim 1, wherein the antenna is constituted of at least two antennas, and
wherein a connecting line for connecting the at least two antennas includes a route turned at a right angle along at least a part of a substantially swastika shape.

10. The wireless power-supply device according to claim 1, wherein the antenna is a patch antenna.

11. The wireless power-supply device according to claim 1, wherein the antenna includes at least two patch antennas, and
wherein the at least two patch antennas are configured for right-handed rotatory polarized waves and left-handed rotatory polarized waves.

12. The wireless power-supply device according to claim 1, wherein the radiation pattern of the electromagnetic waves radiated from the antenna selectively includes at least,
a pattern in which electromagnetic waves are radiated to travel straight along a direction of 0 degree in a three-dimensional space,
a pattern in which electromagnetic waves are radiated to travel leftward relative to the direction of 0 degree, and
a pattern in which electromagnetic waves are radiated to travel rightward relative to the direction of 0 degree.

13. The wireless power-supply device according to claim 1, wherein the radiation pattern of electromagnetic waves radiated from the antenna selectively includes at least,
a pattern in which electromagnetic waves forming one piece of a convex shape are radiated to travel in one direction in a three-dimensional space, and
a pattern in which electromagnetic waves forming two pieces of convex shapes are radiated to travel in one direction in the three-dimensional space.

14. The wireless power-supply device according to claim 1, wherein the radiation pattern is shifted by at least plus or minus 30 degrees by changing the radiation pattern of electromagnetic waves radiated from the antenna.

15. A method for emitting electromagnetic waves to a power receiving device, using the wireless power-supply device according to claim 1 and a control device, wherein the control device includes
tracking a time, a transmitting direction of electromagnetic waves of the
wireless power-supply device, and electric power received by the power receiving device, in response to a change in a position of the power receiving device;
calculating a transmitting direction of electromagnetic waves of the wireless power-supply device based on the tracking; and
controlling the transmitting direction of electromagnetic waves of the wireless power-supply device based on the calculation result.

* * * * *